US012500339B2

(12) United States Patent
Yu et al.

(10) Patent No.: US 12,500,339 B2
(45) Date of Patent: Dec. 16, 2025

(54) ANTENNA AND ELECTRONIC DEVICE

(71) Applicant: Huawei Technologies Co., Ltd., Shenzhen (CN)

(72) Inventors: Dong Yu, Shanghai (CN); Jiaming Wang, Shanghai (CN); Liang Xue, Shanghai (CN); Yuanpeng Li, Shenzhen (CN); Hanyang Wang, Reading (GB); Meng Hou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 18/264,859

(22) PCT Filed: Dec. 10, 2021

(86) PCT No.: PCT/CN2021/137028
§ 371 (c)(1),
(2) Date: Aug. 9, 2023

(87) PCT Pub. No.: WO2022/170842
PCT Pub. Date: Aug. 18, 2022

(65) Prior Publication Data
US 2024/0106119 A1 Mar. 28, 2024

(30) Foreign Application Priority Data
Feb. 10, 2021 (CN) ......................... 202110185331.7

(51) Int. Cl.
*H01Q 5/364* (2015.01)
*H01Q 9/42* (2006.01)

(52) U.S. Cl.
CPC ............... *H01Q 5/364* (2015.01); *H01Q 9/42* (2013.01)

(58) Field of Classification Search
CPC .......... H01Q 5/364; H01Q 9/42; H01Q 1/243; H01Q 1/48; H01Q 9/0421; H01Q 9/0457;
(Continued)

(56) References Cited

U.S. PATENT DOCUMENTS 6,061,025 A * 5/2000 Jackson ............... H01Q 9/0421 343/745
10,218,082 B2 * 2/2019 Zhao ........................ G03H 5/00
(Continued)

FOREIGN PATENT DOCUMENTS

CN 110190381 A 8/2019
CN 209487711 U * 10/2019
(Continued)

OTHER PUBLICATIONS

Hu et al., Design of a Frequency and Polarization Reconfigurable Patch Antenna With a Stable Gain, 2018, IEEE vol. 6, pp. 68169-68175 (Year: 2018).*
(Continued)

*Primary Examiner* — Dameon E Levi
*Assistant Examiner* — Jordan E. DeWitt
(74) *Attorney, Agent, or Firm* — Conley Rose, P.C.

(57) ABSTRACT

An antenna includes a patch radiator, a feed point, a first ground point, and a second ground point. The patch radiator has a first side edge and an intersecting second side edge, and a first coupling contact and a second coupling contact. The patch radiator is coupled to the first ground point and the second ground point through the first coupling contact and the second coupling contact, and is biased coupled to the feed point. A distance between the first coupling contact and the first side edge, a distance between the first coupling contact and the second side edge, a distance between the second coupling contact and the first side edge, and a distance between the second coupling contact and the sec-
(Continued)

ond side edge are all greater than or equal to 0.05λ, where λ is an operating wavelength of the antenna in an operating frequency band range of the antenna.

20 Claims, 45 Drawing Sheets

(58) Field of Classification Search
CPC ............ H01Q 1/22; H01Q 1/241; H01Q 1/52; H01Q 1/38
See application file for complete search history.

(56) References Cited

U.S. PATENT DOCUMENTS

| | | | | |
|---|---|---|---|---|
| 2005/0116873 | A1* | 6/2005 | Soler Castany | H01Q 5/42 343/700 MS |
| 2006/0256018 | A1* | 11/2006 | Soler Castany | H01Q 1/38 343/895 |
| 2017/0271768 | A1* | 9/2017 | Wu | H01Q 9/0421 |
| 2018/0048069 | A1* | 2/2018 | Panther | H01Q 9/0457 |
| 2018/0358704 | A1* | 12/2018 | Liu | H01Q 9/0457 |
| 2020/0411954 | A1* | 12/2020 | Jia | H01Q 15/0026 |
| 2022/0085493 | A1* | 3/2022 | Jia | H01Q 21/065 |
| 2022/0094039 | A1* | 3/2022 | Jia | H01Q 15/0013 |
| 2022/0173525 | A1* | 6/2022 | Jia | H01Q 21/065 |
| 2023/0141980 | A1* | 5/2023 | Tsai | H01Q 5/378 343/893 |
| 2023/0369769 | A1* | 11/2023 | Wu | H01Q 3/24 |
| 2024/0106119 | A1* | 3/2024 | Yu | H01Q 5/364 |
| 2024/0380113 | A1* | 11/2024 | Shi | H01Q 9/045 |

FOREIGN PATENT DOCUMENTS

| | | |
|---|---|---|
| CN | 210805998 U | 6/2020 |
| CN | 214627565 U | 11/2021 |

OTHER PUBLICATIONS

Hu, J., et al., "Design of a Frequency and Polarization Reconfigurable Patch Antenna With a Stable Gain," IEEE Access, Nov. 9, 2018, 7 pages, XP011697067.

* cited by examiner

ANTENNA AND ELECTRONIC DEVICE

CROSS-REFERENCE TO RELATED APPLICATIONS

This is a U.S. National Stage of International Patent Application No. PCT/CN2021/137028 filed on Dec. 10, 2021, which claims priority to Chinese Patent Application No. 202110185331.7 filed on Feb. 10, 2021, both of which are hereby incorporated by reference in their entireties.

This application claims priority to Chinese Patent Application No. 202110185331.7, filed with the China National Intellectual Property Administration on Feb. 10, 2021 and entitled "ANTENNA AND ELECTRONIC DEVICE", which is incorporated herein by reference in its entirety.

TECHNICAL FIELD

This application relates to the field of antenna technologies, and in particular, to a patch antenna and an electronic device having the patch antenna.

BACKGROUND

Evolution of 5G communications technologies brings problems of an increase in a quantity of antennas, a plurality of SARs (electromagnetic power absorbed or consumed by human body tissue per unit mass) of antennas, and directivity coverage. How to design a patch (patch) antenna with a low SAR and low directivity in limited Z-direction space of a back cover support is a problem to be resolved currently.

SUMMARY

This application provides an antenna with a low SAR, low directivity, and high efficiency. The antenna includes:

a patch radiator, where the patch radiator has a first side edge and a second side edge, the first side edge intersects with the second side edge, and the patch radiator has a first coupling contact and a second coupling contact;

a first ground point, coupled to the patch radiator through the first coupling contact, and is configured to ground the patch radiator; and a second ground point, coupled to the patch radiator through the second coupling contact, and is configured to ground the patch radiator, where the first coupling contact and the second coupling contact are disposed at an interval, and a distance between the first coupling contact and the first side edge, a distance between the first coupling contact and the second side edge, a distance between the second coupling contact and the first side edge, and a distance between the second coupling contact and the second side edge are all greater than or equal to 0.05λ, where λ is an operating wavelength of the antenna in an operating frequency band range of the antenna.

In a specific implementation, λ is a maximum operating wavelength of the antenna in the operating frequency band range of the antenna.

In a specific implementation, the distance between the first coupling contact and the first side edge is H1, and the distance between the first coupling contact and the second side edge is W1, and the distance between the second coupling contact and the first side edge is H2, and the distance between the second coupling contact and the second side edge is W2, where $$0.25\lambda \le W1+H1 \le 0.5\lambda, \text{ and } 0.25\lambda \le W2+H2 \le 0.5\lambda.$$

In a specific implementation, W1=W2, and/or H1=H2.

In a specific implementation, the antenna further includes a feed point, the patch radiator is a support antenna radiator, and the first ground point, the second ground point, and the feed point are directly coupled to the support antenna radiator.

In a specific implementation, the first coupling contact and the second coupling contact are spaced on the patch radiator along a first direction, or the first coupling contact and the second coupling contact are spaced on the patch radiator along a second direction, where the first direction is an extension direction of the first side edge, and the second direction is an extension direction of the second side edge.

In a specific implementation, a distance between the first coupling contact and the second coupling contact is greater than 0.1λ along the first direction, or a distance between the first coupling contact and the second coupling contact is greater than 0.1λ along the second direction.

In a specific implementation, both a length of the first side edge and a length of the second side edge are less than 0.5λ.

In a specific implementation, the patch radiator is a rectangle, two first side edges are disposed, the two first side edges are disposed opposite to each other, two second side edges are disposed, and the two second side edges are disposed opposite to each other.

In a specific implementation, the length of the first side edge is greater than the length of the second side edge.

In a specific implementation, the antenna further includes a switch module, and the switch module is connected to the first ground point and the second ground point, and is configured to connect or disconnect both the first ground point and the second ground point to the ground.

In a specific implementation, the patch radiator is provided with a groove, and the groove is disposed on the first side edge and is recessed along the second direction, or the groove is disposed on the second side edge and is recessed along the first direction.

In a specific implementation, the antenna further includes a feed point, the patch radiator is a floating radiator, and the first ground point, the second ground point, and the feed point are separately indirectly coupled to the floating radiator.

In a specific implementation, the antenna further includes a first branch, the patch radiator and the first branch are disposed at an interval, the first ground point and the second ground point are disposed on the first branch, and the patch radiator is indirectly coupled and grounded through the first branch.

In a specific implementation, the antenna further includes a second branch, the patch radiator and the second branch are disposed at an interval, the feed point is disposed on the second branch, and the patch radiator is indirectly coupled and fed through the second branch.

In a specific implementation, the patch radiator is a patch antenna radiator.

Correspondingly, this application further provides an electronic device. The electronic device includes a mainboard, a battery cover, and the antenna in any one of the foregoing implementations. The mainboard, the antenna, and the battery cover are sequentially disposed along a thickness direction of the electronic device.

In a specific implementation, the antenna further includes a support, the patch radiator is disposed on the support, and the support is disposed on the mainboard; or the antenna further includes a flexible circuit board, the patch radiator is disposed on the flexible circuit board, and the flexible circuit board is connected to the mainboard.

In a specific implementation, the battery cover includes an insulation inner surface, the patch radiator is a floating radiator disposed on the insulation inner surface, and the first ground point and the second ground point are separately indirectly coupled to the floating radiator.

In a specific implementation, the floating radiator is indirectly coupled to the ground through the first branch, and the mainboard, the first branch, the floating radiator, and the battery cover are sequentially disposed along the thickness direction of the electronic device.

It should be understood that the foregoing general description and the following detailed description are merely examples, and cannot limit this application.

Compared with the conventional technology, in this application, at least two ground points are coupled to a patch radiator, and distances from coupling contacts that are of the ground points and that are on the patch radiator to each side edge are greater than or equal to 0.05λ, where λ is an operating wavelength of an antenna in an operating frequency band of the antenna, so that currents on the patch radiator can be evenly distributed around, to form an omni-directional pattern. This reduces a directivity coefficient, and enables the patch antenna to have features such as a low SAR and high efficiency.

It should be understood that the foregoing general description and the following detailed description are merely examples, and cannot limit this application.

REFERENCE NUMERALS

Figure 1:
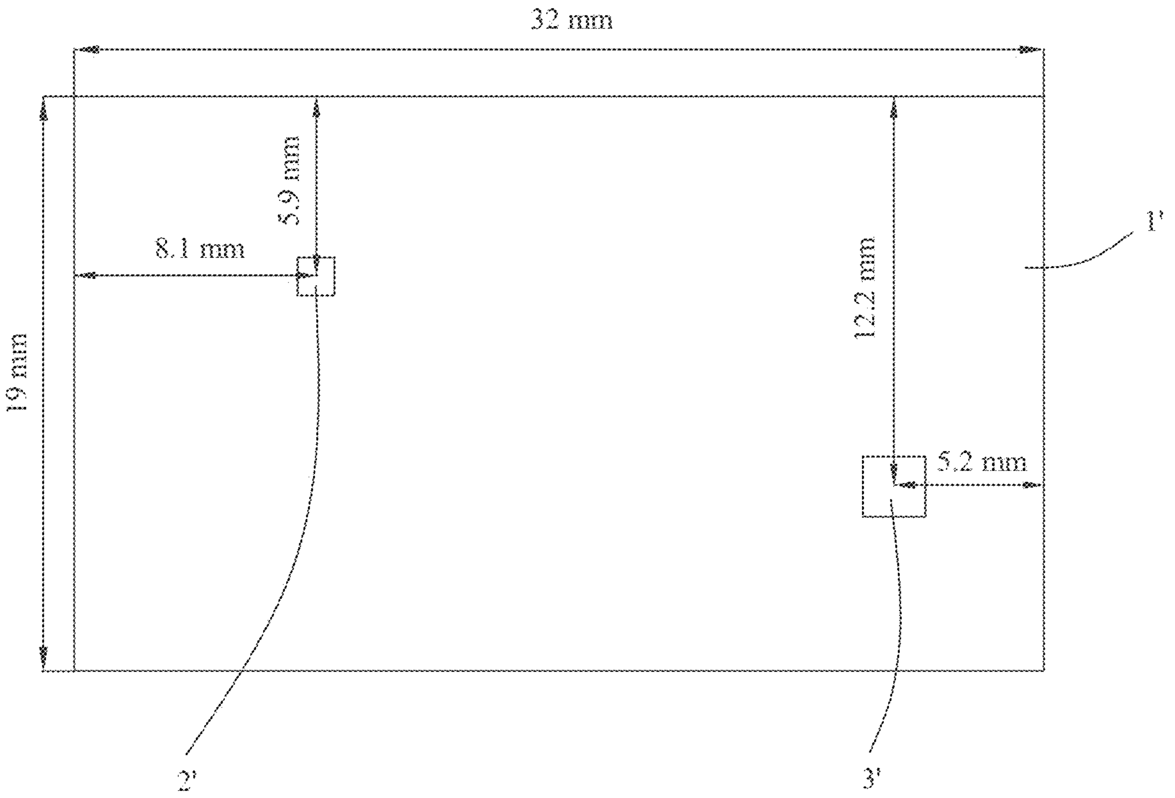
FIG. 1 is a schematic diagram of a structure of a patch antenna.

1. Antenna; 10. Patch radiator: 100. Groove, 11. First side edge; 12. Second side edge: 2. Ground point: 21. First ground point: 22. Second ground point; 3. Feed point; 4. Screen; 5. Middle frame. 6. Mainboard; 7. Battery cover; 8. First branch; and 9. Second branch.

The accompanying drawings herein are incorporated into the specification and constitute a part of the specification, show embodiments conforming to this application, and are used together with the specification to explain a principle of this application.

DESCRIPTION OF EMBODIMENTS

To better understand the technical solutions of this application, the following describes embodiments of this application in detail with reference to the accompanying drawings.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that orientation words such as "above", "below", "left", and "right" described in embodiments of this application are described from perspectives shown in the accompanying drawings, and should not be construed as a limitation on embodiments of this application. Moreover, in the context, it also should be understood that, when it is mentioned that one element is connected "above" or "below" another element, the element can be directly connected "above" or "below" the another element, or may be indirectly connected "above" or "below" the another element through an intermediate element.

In the following, a C mode and a D mode are defined based on flow directions of currents generated on an antenna. When currents generated on an antenna radiator are currents that are spread around by using a ground point as a base point (for example, currents that flow in a symmetric direction by using the ground point as the base point), the antenna is defined as the C mode of the antenna. When flow directions of the currents generated on the antenna radiator are the same, the antenna is defined as the D mode of the antenna. A patch antenna is used as an example. A patch antenna operating on the C mode needs at least one ground point. When there is a specific distance between the ground point and a surrounding area of a patch antenna radiator, flow directions of currents generated on the patch antenna radiator are symmetrically spread around by using the ground point as a base point, and radiation of the patch antenna is implemented by the patch antenna radiator and the ground. A patch antenna operating in a D mode does not need a ground point (it should be understood that the patch antenna operating in the D mode may alternatively have a ground point). Flow directions of currents generated on a patch antenna radiator are the same, and radiation is mainly implemented by the patch antenna radiator.

Figure 2:
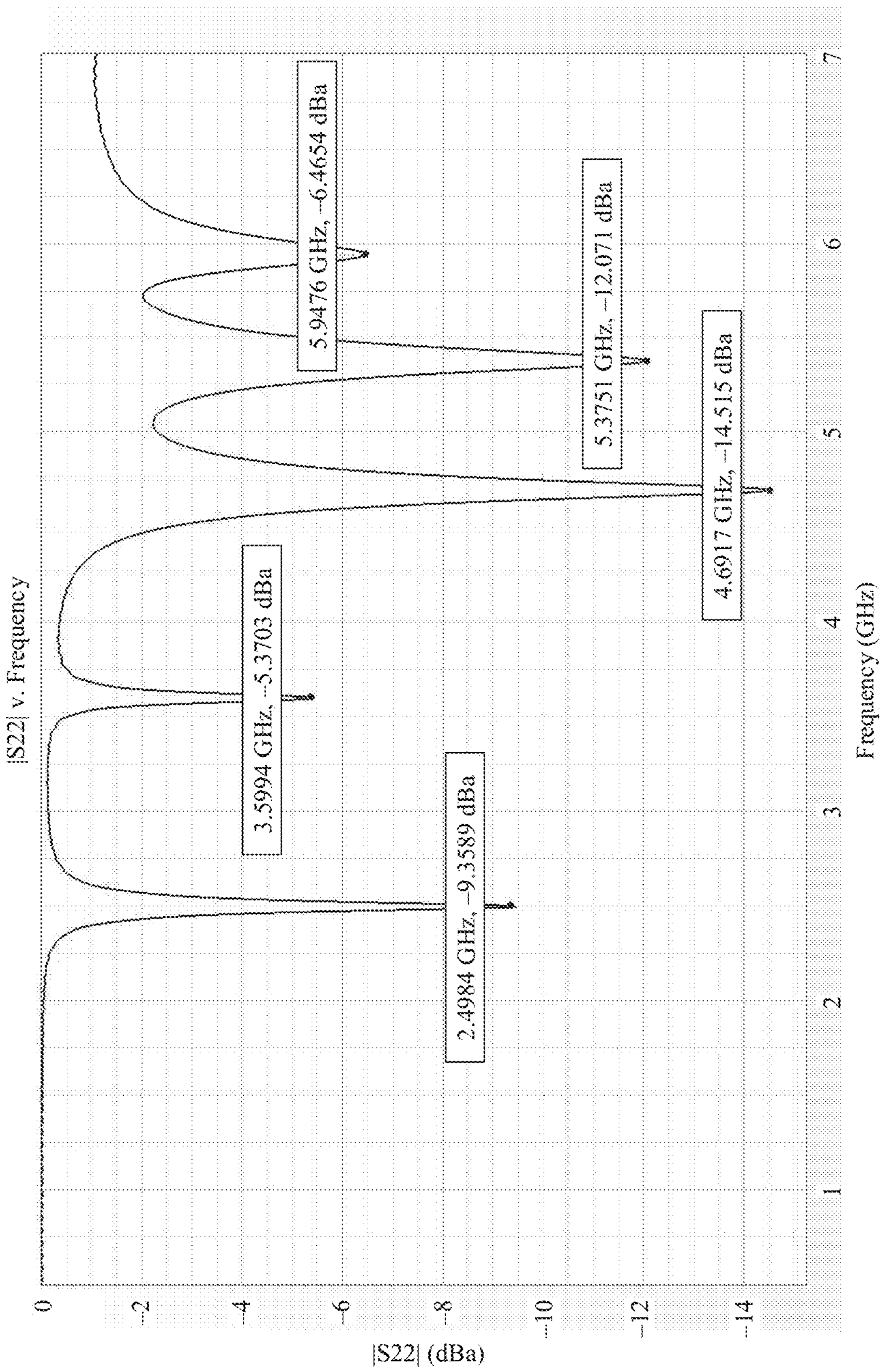
FIG. 2 is a schematic diagram of S11 of the patch antenna shown in FIG. 1.
Figure 3:
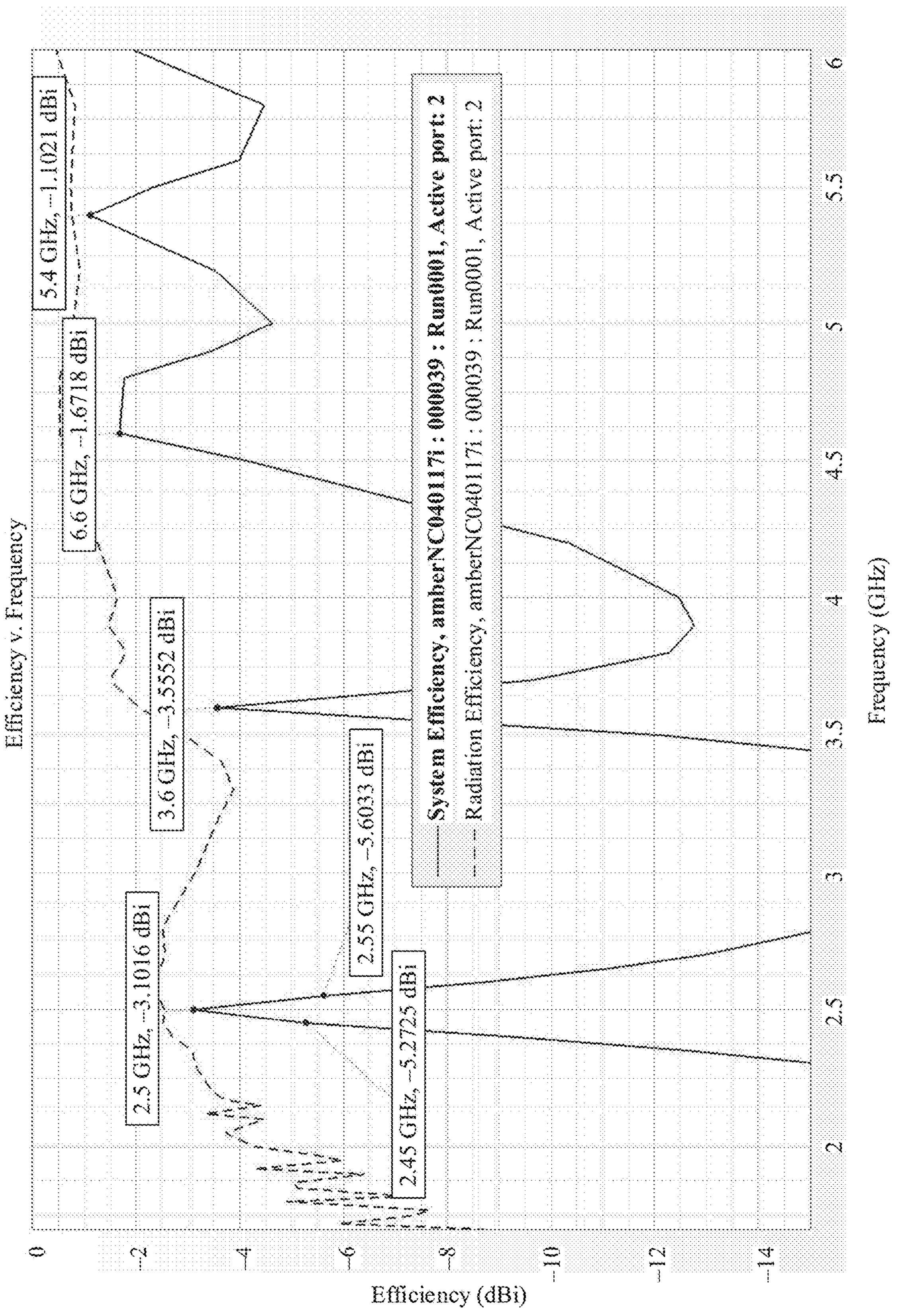
FIG. 3 is a schematic diagram of efficiency of the patch antenna shown in FIG. 1.
Figure 4:
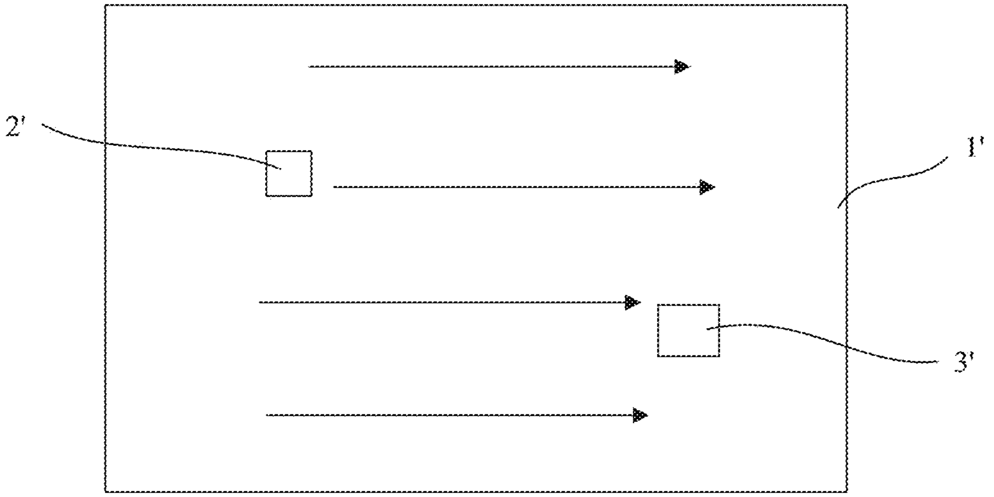
FIG. 4 is a schematic diagram of current distribution of the patch antenna shown in FIG. 1.
Figure 5:
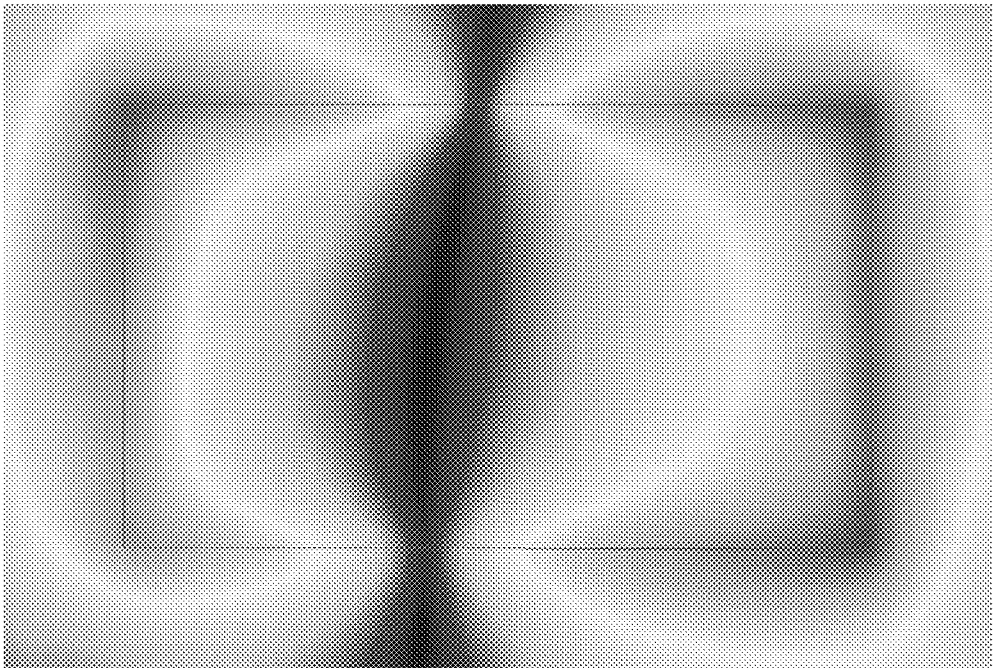
FIG. 5 is a schematic diagram of electric field distribution of the patch antenna shown in FIG. 1.
Figure 6A:
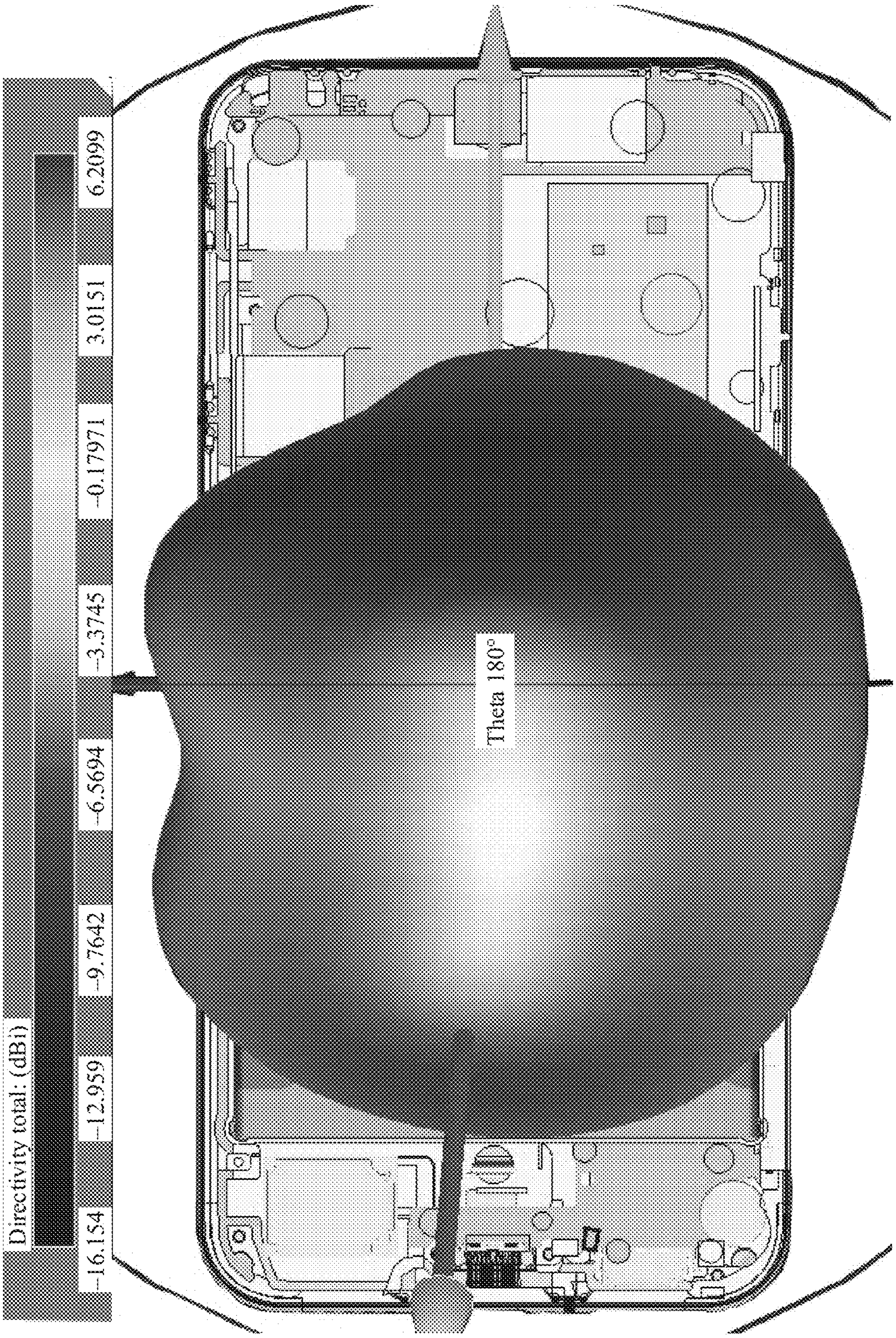
FIG. 6(*a*) and FIG. 6(*b*) are directivity patterns of the patch antenna shown in FIG. 1.
Figure 6B:
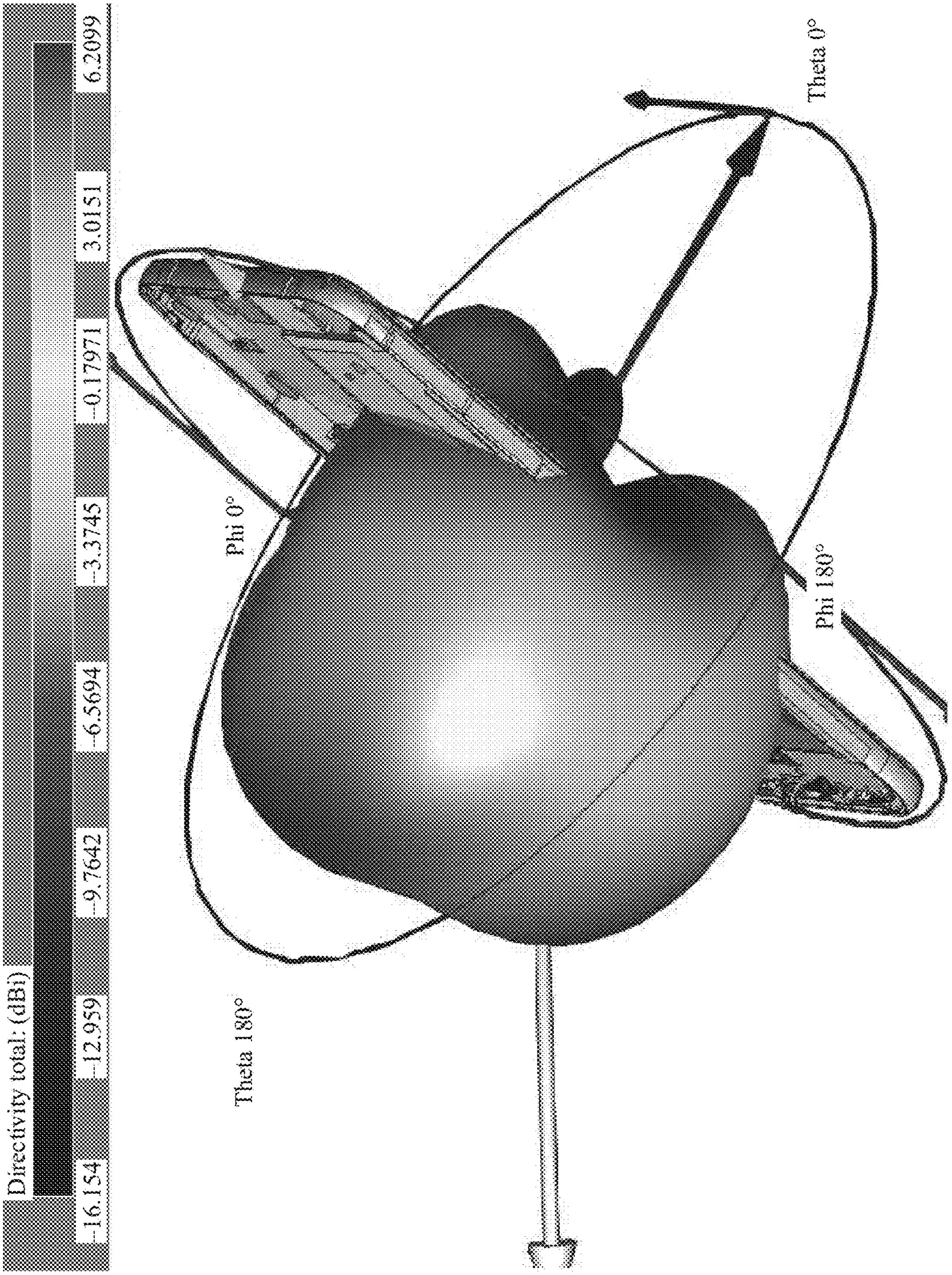

FIG. 1 is a schematic diagram of a structure of a patch antenna 1'. The patch antenna 1' is also referred to as a patch antenna or a panel antenna. The patch antenna 1' shown in FIG. 1 is, for example, a rectangle, and has a length and a width of 32 mm*19 mm. Aground point 2' is, for example, disposed on an upper left side of the patch antenna 1' shown in the figure. A feed point 3' (a position at which the antenna is connected to a feeder line is referred to as a feed point, and the feeder line is a connection line between the antenna and a receiver) is biased, and capacitive feeding (for example, the feed point 3' is indirectly coupled to the feeder line, or a capacitor is connected in series between the feed point 3' and the feeder line) is used. For example, the feed point 3' is disposed on a lower right side of the patch antenna 1' shown in the figure. A co-directional current is generated on the patch antenna 1', that is, a D mode of the patch antenna is activated. Further, a 1.5 pF capacitor and a 0.5 nH inductor are connected in parallel to the ground point 2', and the antenna in the D mode is loaded to a 2.4 G frequency band. The capacitor and the inductor connected to the ground point 2' are used for frequency modulation. A 0.5 pF capacitor and a 1 nH inductor are connected in series to the feed point 3', and the capacitor and the inductor connected to the feed point 3' are used for impedance matching. S11 (S11 indicates a return loss characteristic of the antenna, and this parameter indicates transmit efficiency of the antenna. A larger value indicates greater energy reflected by the antenna, and therefore, the efficiency of the antenna is poorer) and efficiency of the patch antenna in FIG. 1 are respectively shown in FIG. 2 and FIG. 3. FIG. 4 is a current distribution diagram of the patch antenna in FIG. 1. An arrow direction in the figure represents a current direction. It can be learned from the figure that the patch antenna mainly generates transverse co-directional currents, as shown in FIG. 4. FIG. 5 is a diagram of electric field distribution of the patch antenna shown in FIG. 1. It can be learned from the figure that an electric field of an intermediate part of the patch antenna is the weakest, and electric fields of two sides of the patch antenna are the strongest. FIG. 6(*a*) and FIG. 6(*b*) are directivity patterns of different angles of view. Directivity of the patch antenna in FIG. 1 may be read from the diagrams. The following Table 1 shows parameter values of the patch antenna shown in FIG. 1.

Table 1 Shows Parameter Values of the Patch Antenna Shown in FIG. 1

| | | |
|---|---|---|
| Input power 24 dBm | Resonance frequency | 2.4 GHz |
| | | 10 g |
| | FS simulation efficiency | −3.1 |
| Body SAR | 5 mm backside | 7.24 |
| Normalized efficiency | | −5 |
| Normalized body SAR | 5 mm backside | 4.67 |

The patch antenna operates in the D mode, and mainly generates co-directional currents. A −5.5 dB efficiency bandwidth covers 10 MHz, but an SAR value of the patch antenna is high (4.67) and directivity is high (6.21). Efficiency may be read from FIG. 3, and directivity may be read from FIG. 6(*a*) and FIG. 6(*b*). In Table 1, the body SAR corresponds to simulation efficiency, and the normalized body SAR corresponds to normalized efficiency. Normalizing the simulation efficiency and the body SAR is to compare body SARs at a same efficiency, so that a comparison result is more accurate. For example, when normalized efficiency of all antennas is −5, a smaller normalized body SAR value of an antenna indicates a smaller SAR value of the patch antenna.

Figure 7:
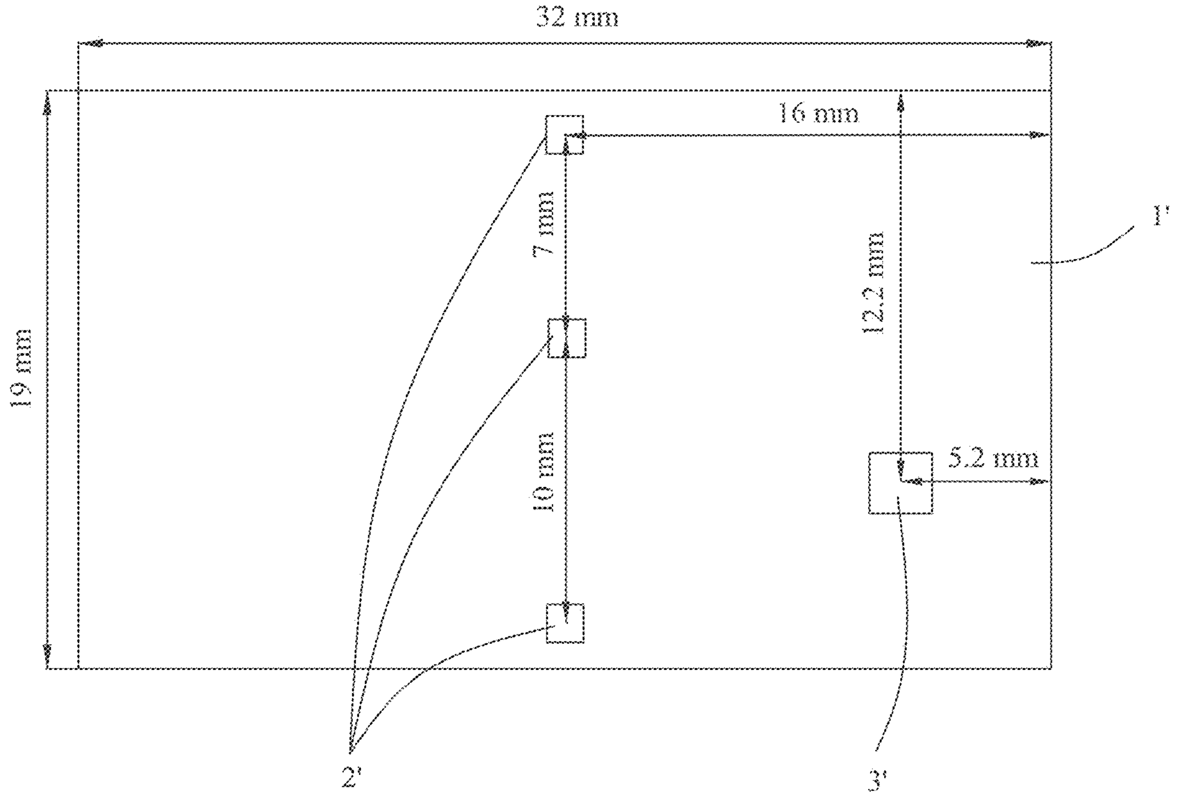
FIG. 7 is a schematic diagram of a structure of another patch antenna.

FIG. 7 is a schematic diagram of a structure of another patch antenna 1'. The patch antenna 1 is, for example, a rectangle, and has a length and a width of 32 mm*19 mm. A ground point 2' is, for example, disposed on a middle part of the patch antenna 1' shown in the figure. A feed point 3' is biased and uses capacitive feeding, for example, disposed on a lower right side of the patch antenna 1' shown in the figure. Further, a 0.5 pF capacitor and a 1 nH inductor are connected in series to the feed point 3'. The patch antenna 1' generates transverse currents (for example, transverse currents that are symmetrically centered on the ground point) spread from the ground point, that is, a C mode of the patch antenna 1' is activated. The C mode has transverse currents, and an operating frequency band is 2.4 GHz. In addition, a D mode of the patch antenna can be activated. The D mode has transverse currents, and an operating frequency band is 2.8 GHz.

Figure 8:
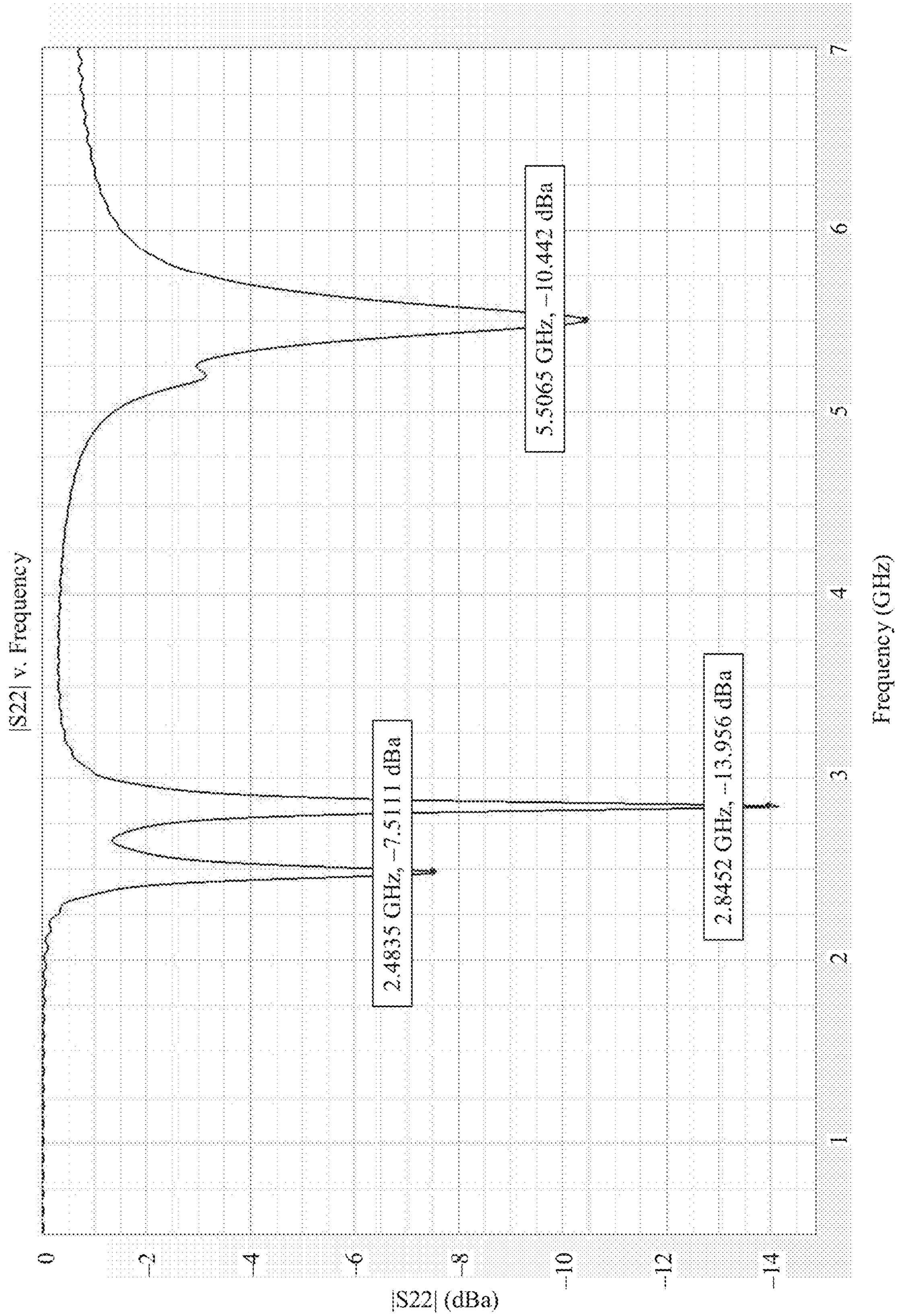
FIG. 8 is a schematic diagram of S11 of the patch antenna shown in FIG. 7.
Figure 9:
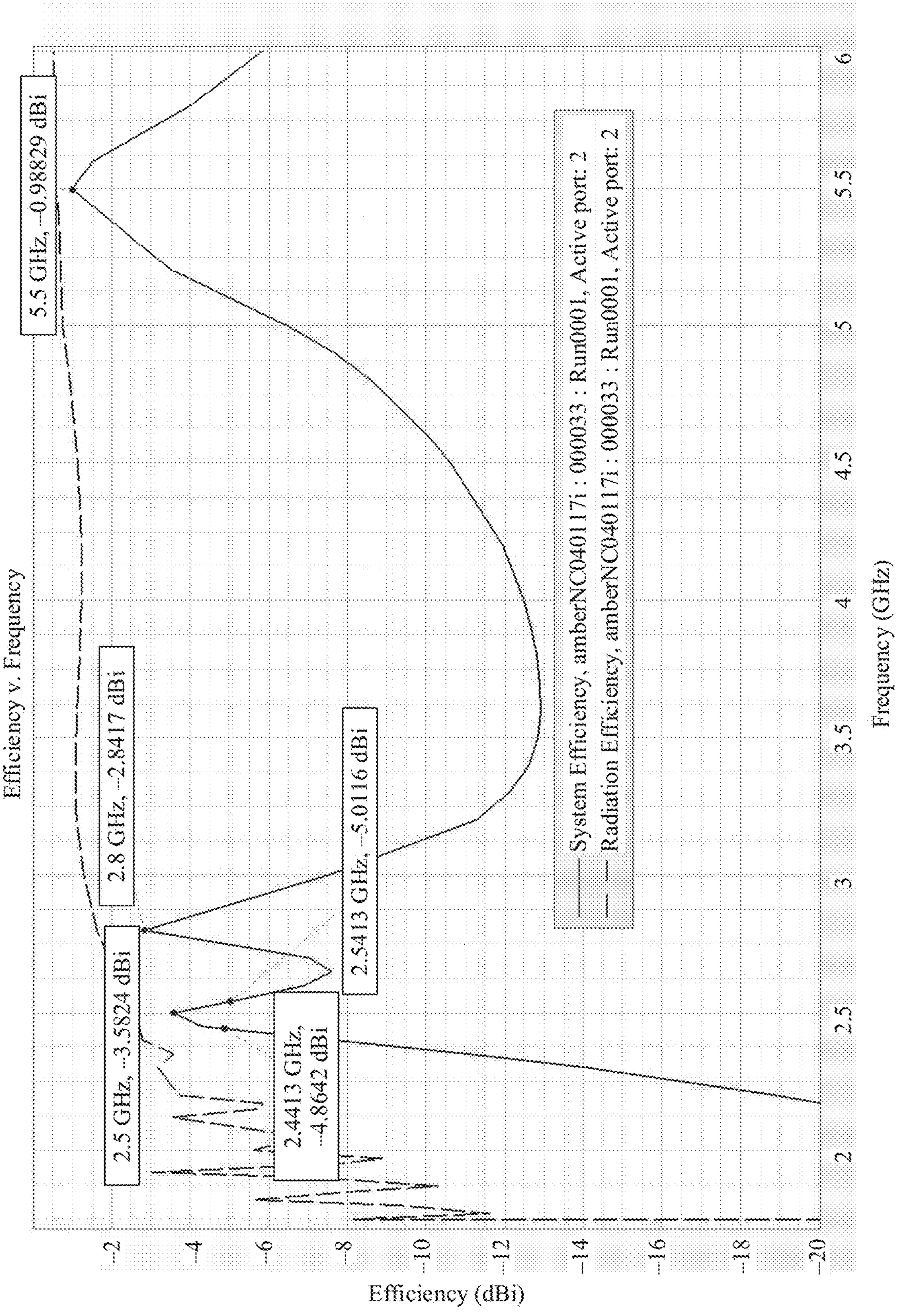
FIG. 9 is a schematic diagram of efficiency of the patch antenna shown in FIG. 7.
Figure 10:
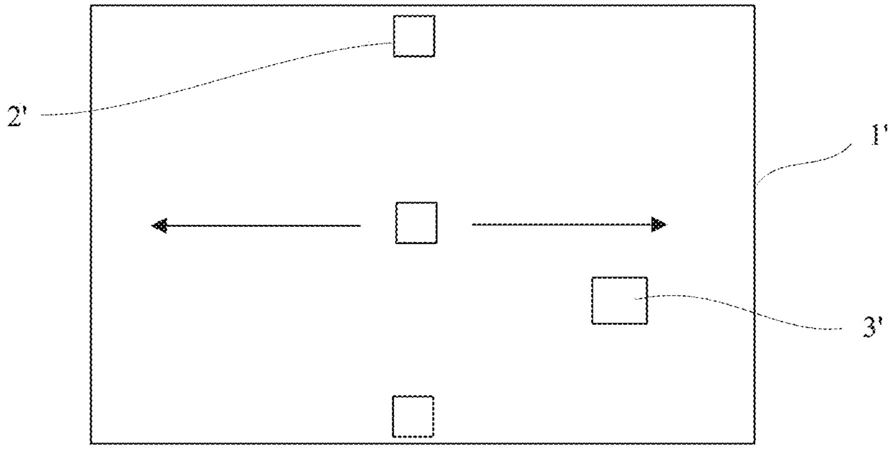
FIG. 10 is a schematic diagram of current distribution of the patch antenna shown in FIG. 7.
Figure 11:
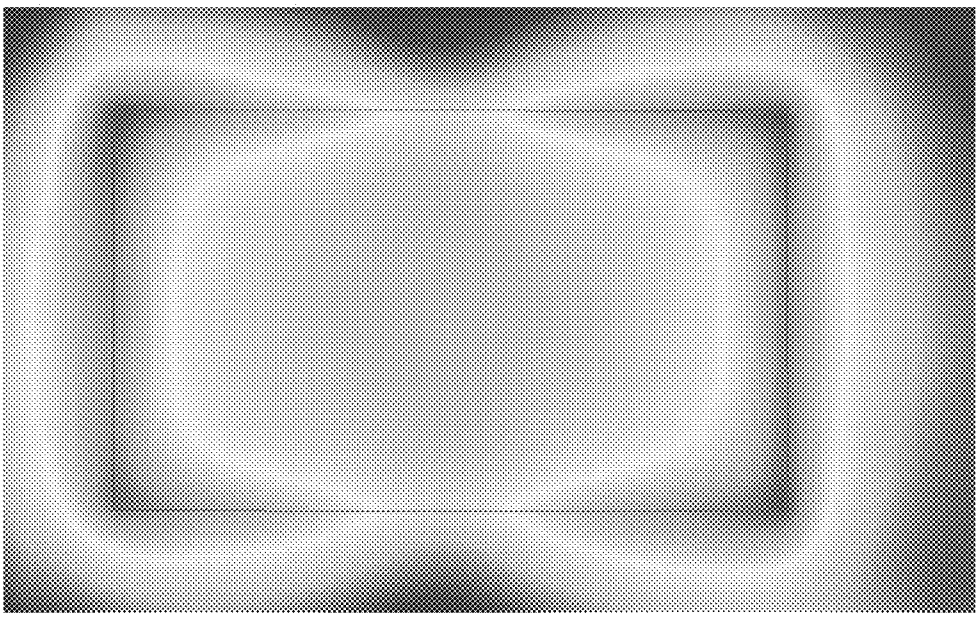
FIG. 11 is a schematic diagram of electric field distribution of the patch antenna shown in FIG. 7.
Figure 12A:
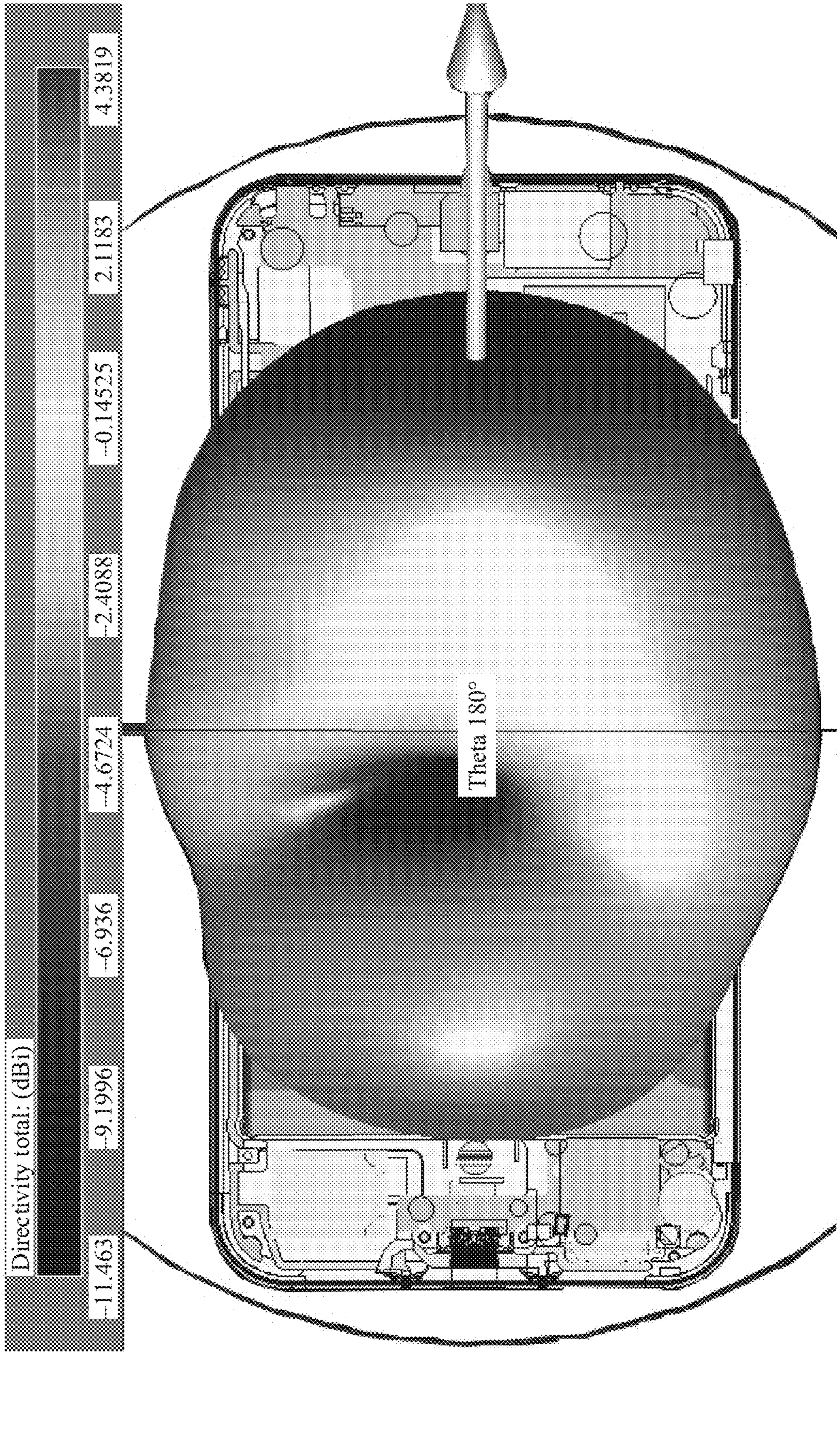
FIG. 12(*a*) and FIG. 12(*b*) are directivity patterns of the patch antenna shown in FIG. 7.
Figure 12B:
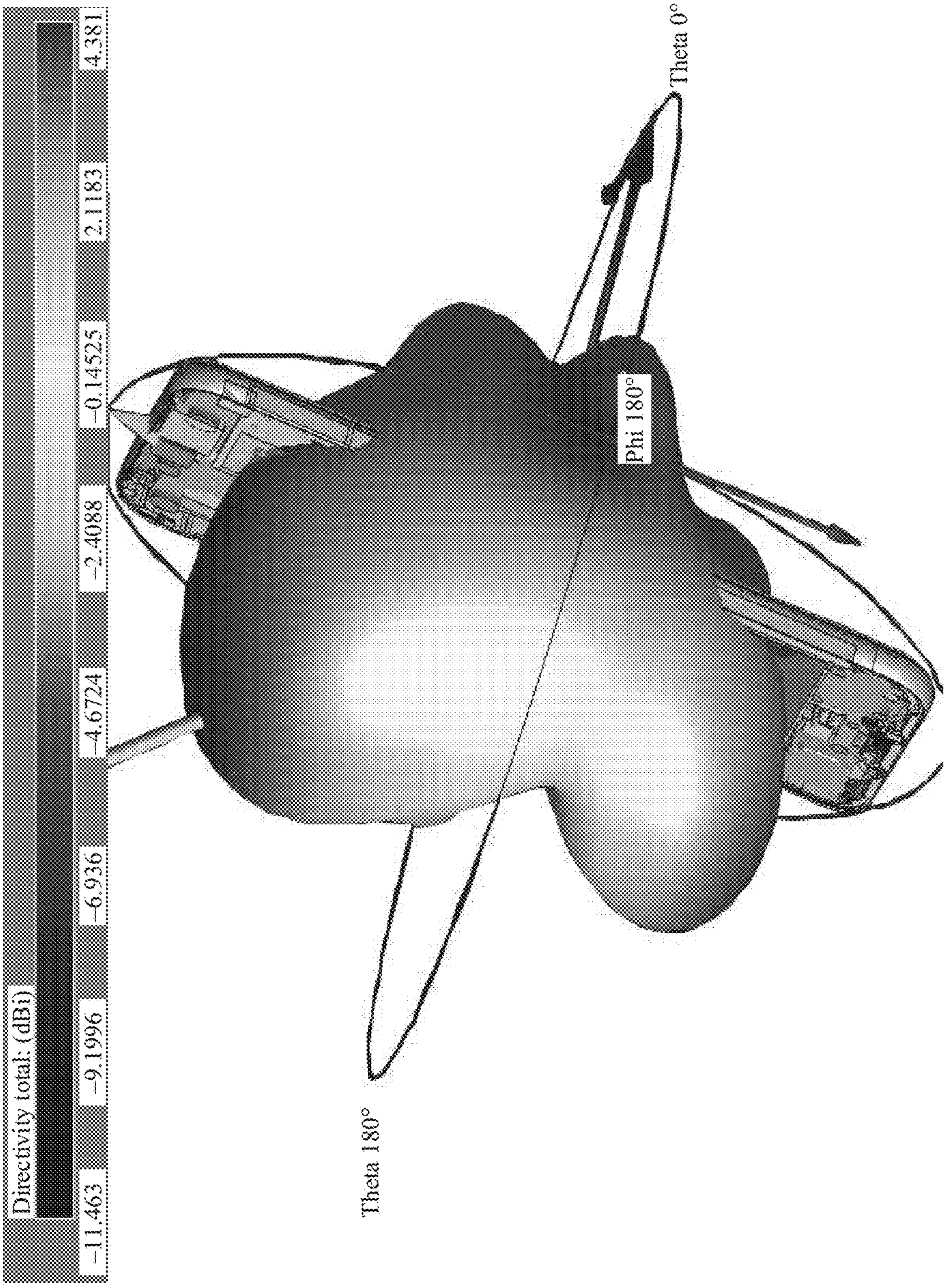

S11 and efficiency generated by the patch antenna are respectively shown in FIG. 8 and FIG. 9. FIG. 10 is a current distribution diagram of the patch antenna in FIG. 7. An arrow direction in the figure represents a current direction. It can be learned from the figure that the patch antenna mainly generates transverse symmetric currents. FIG. 11 is an electric field distribution diagram of the patch antenna in FIG. 7. It can be learned from the figure that electric fields on two sides of the patch antenna are the strongest. FIG. 12(*a*) and FIG. 12(*b*) are directivity patterns of different angles of view. Directivity of the patch antenna in FIG. 7 may be read from the diagrams. The following Table 2 shows parameter values of the patch antenna shown in FIG. 7.

Table 2 Shows Parameter Values of the Patch Antenna Shown in FIG. 7

| | | |
|---|---|---|
| Input power 24 dBm | Resonance frequency | 2.45 GHz |
| | | 10 g |
| | FS simulation efficiency | −3.5 |
| Body SAR | 5 mm backside | 2.25 |
| Normalized efficiency | | −5 |
| Normalized body SAR | 5 mm backside | 1.59 |

Three ground points 2' need to be disposed along a longitudinal direction of the patch antenna, and the C mode of the patch antenna is activated, and the patch antenna in the C mode has symmetric transverse currents. Referring to FIG. 10, a −5 dB efficiency bandwidth covers 100 MHz, but an SAR value of the patch antenna is low (1.59), a directivity pattern is distributed from left to right, there are fewer currents on an upper part and a lower part, and directivity is high (4.38). Efficiency may be read from FIG. 9, and directivity may be read from FIG. 12(*a*) and FIG. 12(*b*).

Figure 13:
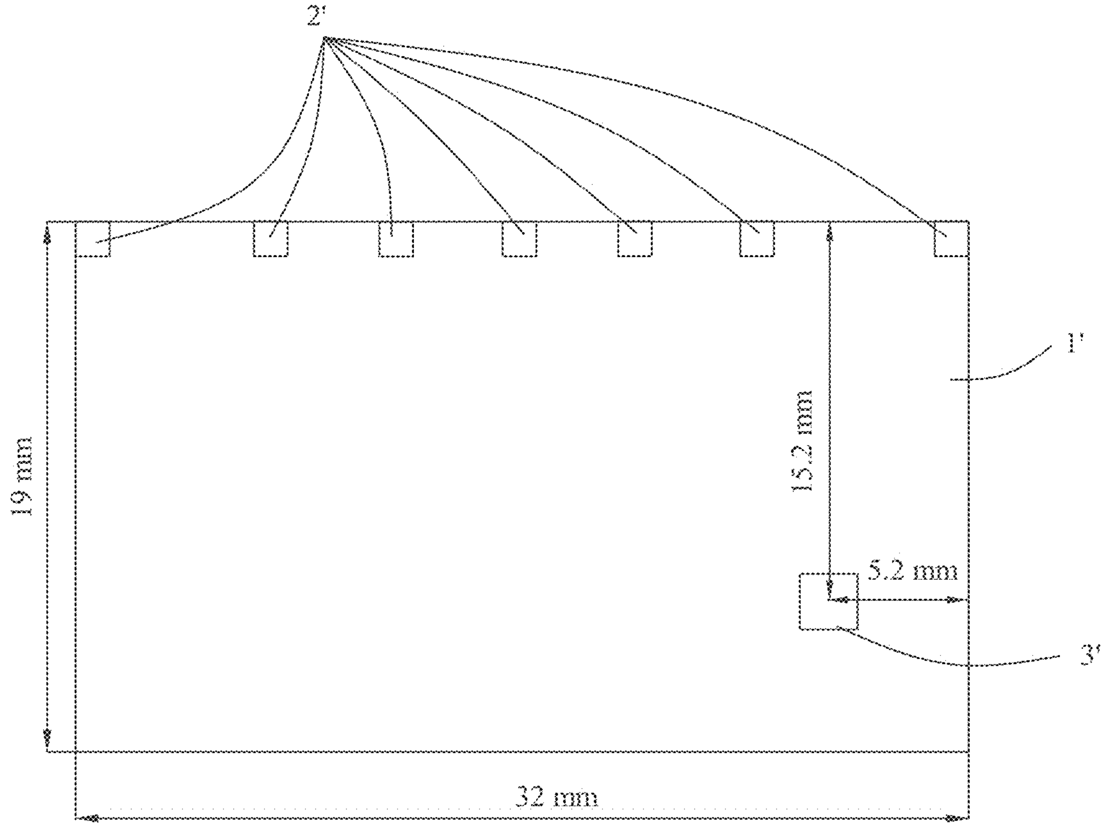
FIG. 13 is a schematic diagram of a structure of still another patch antenna.

FIG. 13 is a schematic diagram of a structure of still another patch antenna 1'. The patch antenna 1' is, for example, a rectangle, and has a length and a width of 32 mm*19 mm. A ground point 2' is, for example, disposed on an upper edge of the patch antenna F shown in the figure. A feed point 3' is biased and uses capacitive feeding, for example, disposed on a lower right side of the patch antenna 1' shown in the figure. Further, a 0.5 pF capacitor and a 1 nH inductor are connected in series to the feed point 3'. The patch antenna 1' generates longitudinal currents spread from the ground point, and a C mode of the patch antenna is activated. The C mode has longitudinal currents, and an operating frequency band is 2.4 GHz. In addition, a D mode of the patch antenna can be activated. The D mode has transverse currents, and an operating frequency band is 3.7 GHz. It should be understood that ground points of the patch antenna 1' in FIG. 13 are all disposed on the upper edge of the patch antenna 1'. Therefore, the C mode of the antenna generates only currents that are spread downward from the ground points.

Figure 14:
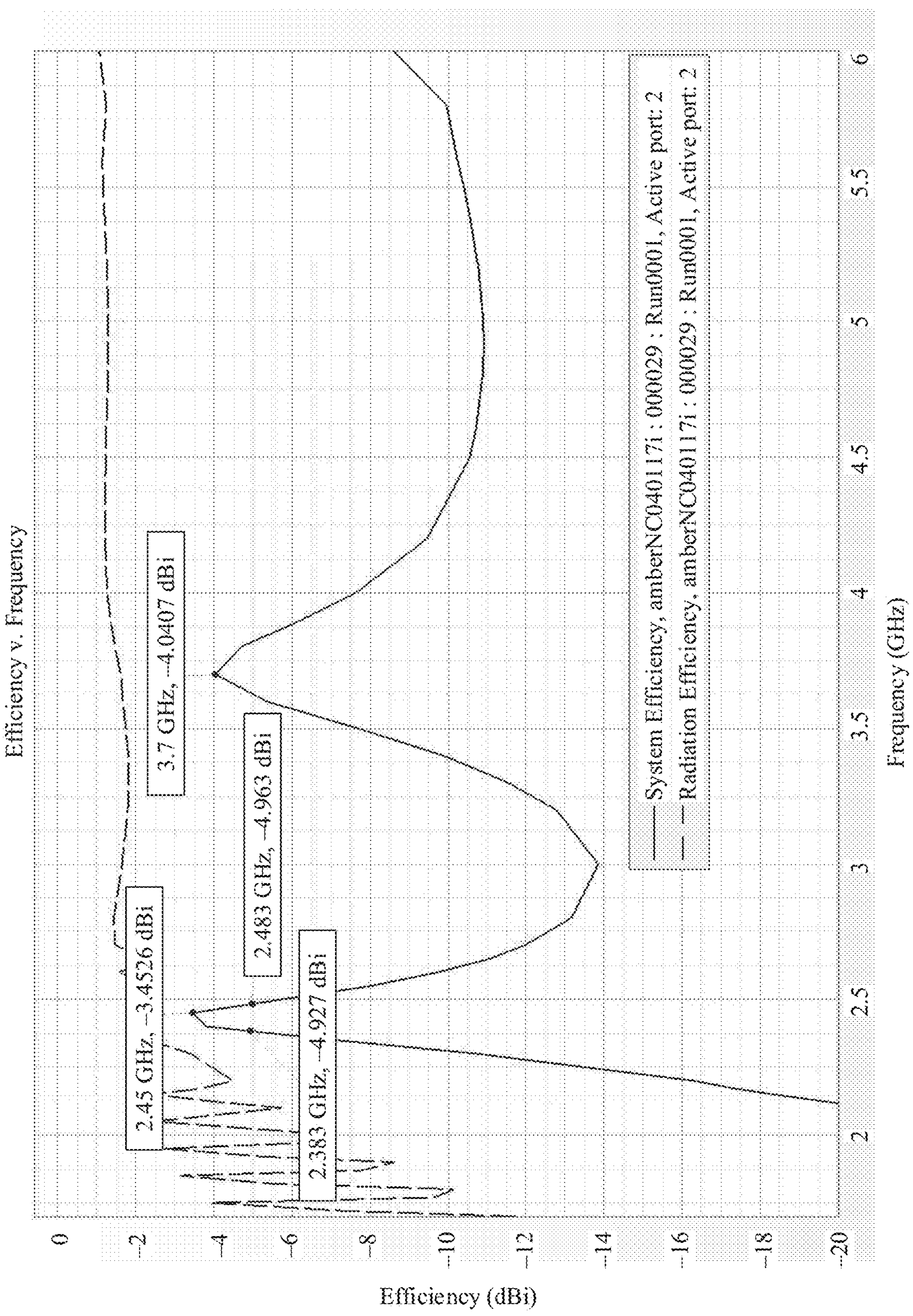
FIG. 14 is a schematic diagram of S11 of the patch antenna shown in FIG. 13.
Figure 15:
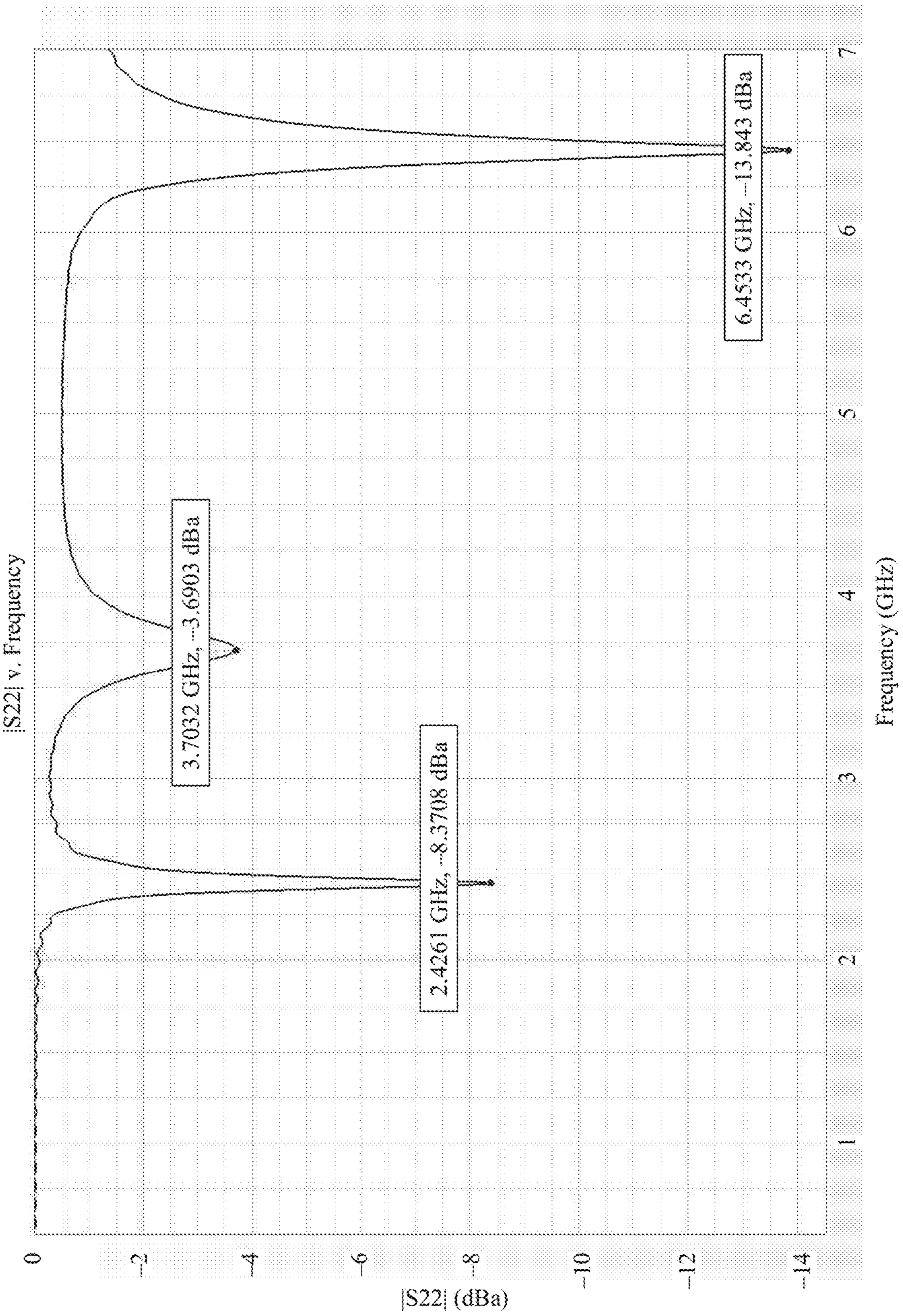
FIG. 15 is a schematic diagram of efficiency of the patch antenna shown in FIG. 13.
Figure 16:
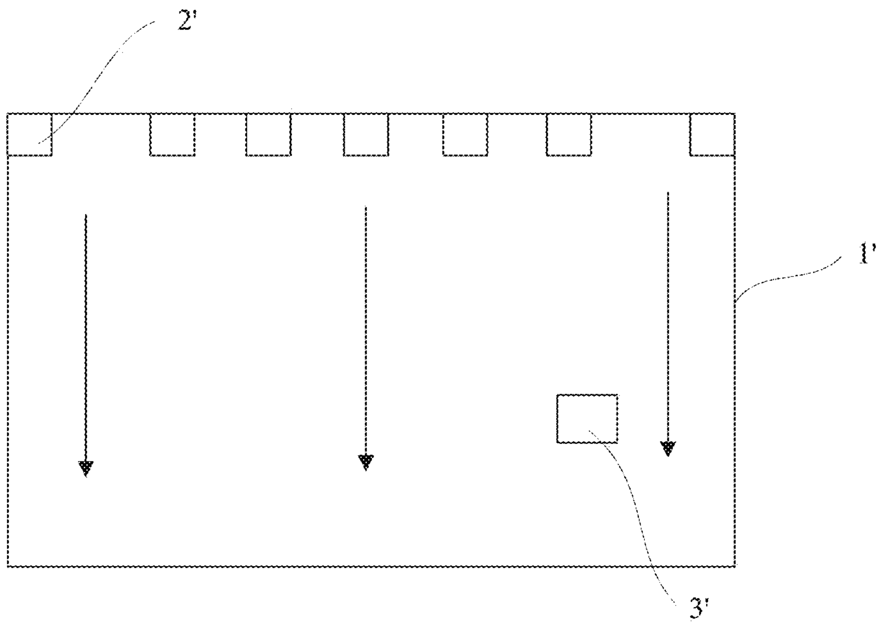
FIG. 16 is a schematic diagram of current distribution of the patch antenna shown in FIG. 13.
Figure 17:
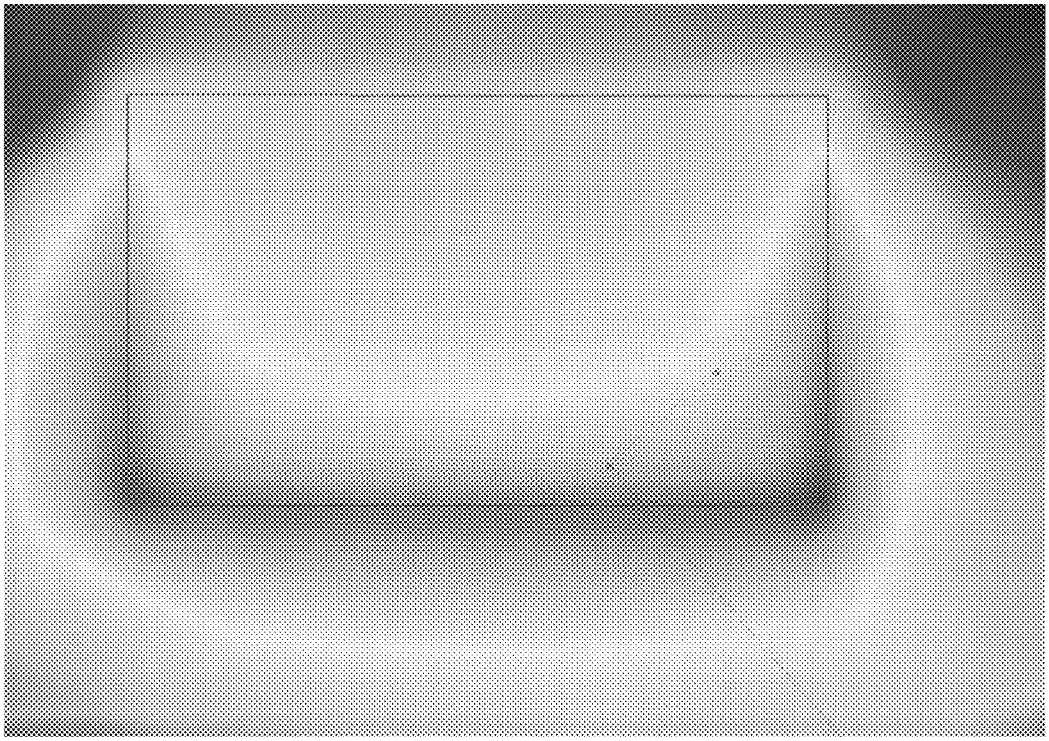
FIG. 17 is a schematic diagram of electric field distribution of the patch antenna shown in FIG. 13.
Figure 18A:
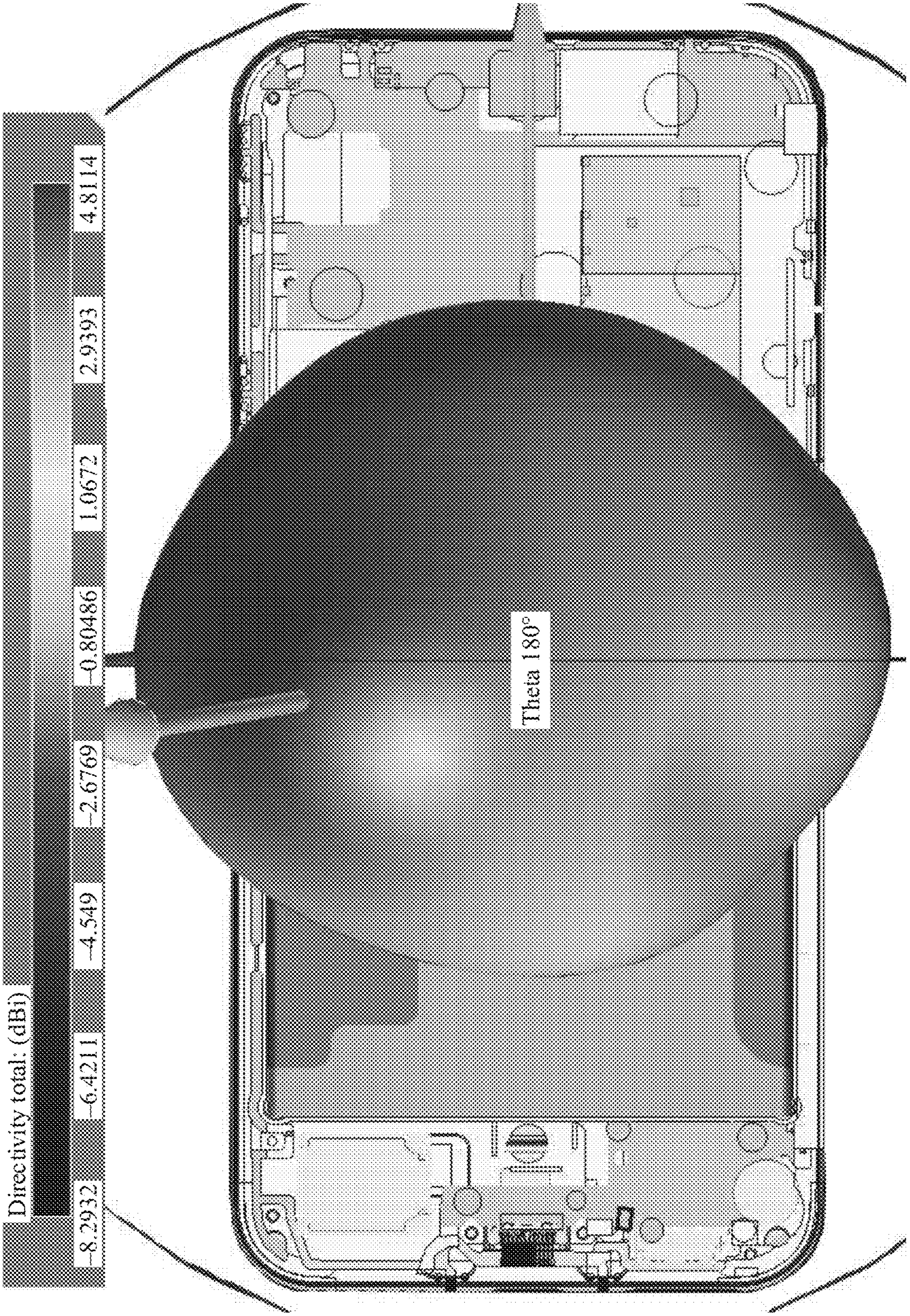
FIG. 18(*a*) and FIG. 18(*b*) are directivity patterns of the patch antenna shown in FIG. 13.
Figure 18B:
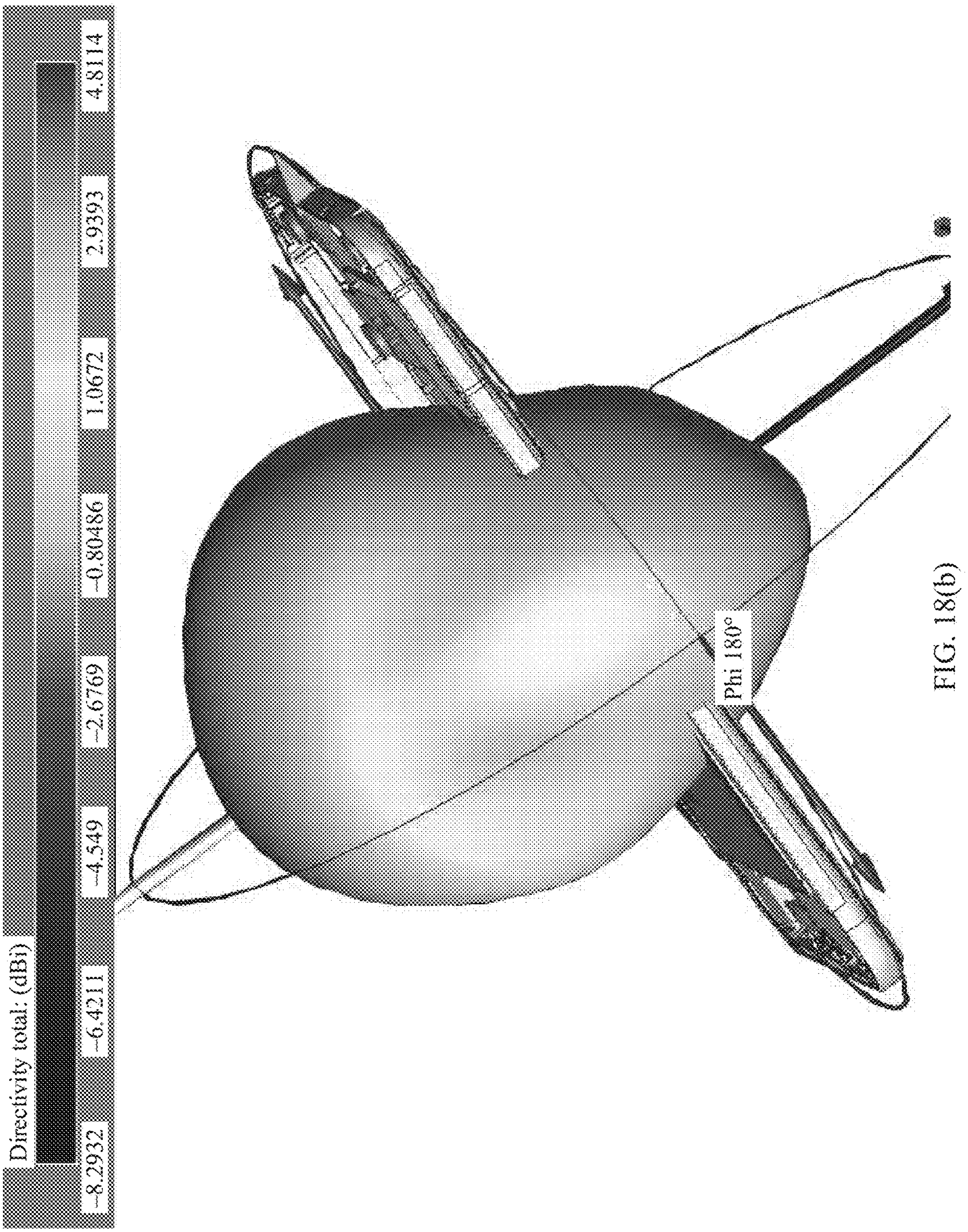

S11 and efficiency generated by the patch antenna are respectively shown in FIG. 14 and FIG. 15. FIG. 16 is a current distribution diagram of the patch antenna in FIG. 13. An arrow direction in the figure represents a current direction. It can be learned from the figure that the patch antenna generates longitudinal currents. FIG. 17 is an electric field distribution diagram of the patch antenna in FIG. 13. It can be learned from the figure that an electric field on a lower side of the patch antenna is the strongest. FIG. 18(*a*) and FIG. 18(*b*) are directivity patterns of different angles of view. Directivity of the patch antenna in FIG. 13 may be read from the diagrams.

The following Table 3 shows parameter values of the patch antenna shown in FIG. 13.

Table 3 Shows Parameter Values of the Patch Antenna Shown in FIG. 13

| | | |
|---|---|---|
| Input power 24 dBm | Resonance frequency | 2.45 GHz |
| | | 10 g |
| | FS simulation efficiency | −3.5 |
| Body SAR | 5 mm backside | 1.65 |
| Normalized efficiency | | −5 |
| Normalized body SAR | 5 mm backside | 1.17 |

A plurality of ground points 2' need to be disposed transversely for the patch antenna, and the C mode of the patch antenna is activated, and the patch antenna in the C mode has longitudinal currents. Referring to FIG. 16, a −4.9 dB efficiency bandwidth covers 100 MHz, but an SAR value of the patch antenna is low (1.17), a directivity pattern is offset to one side, and directivity is high (4.81). Efficiency may be read from FIG. 15, and directivity may be read from FIG. 18(*a*) and FIG. 18(*b*).

Figure 19:
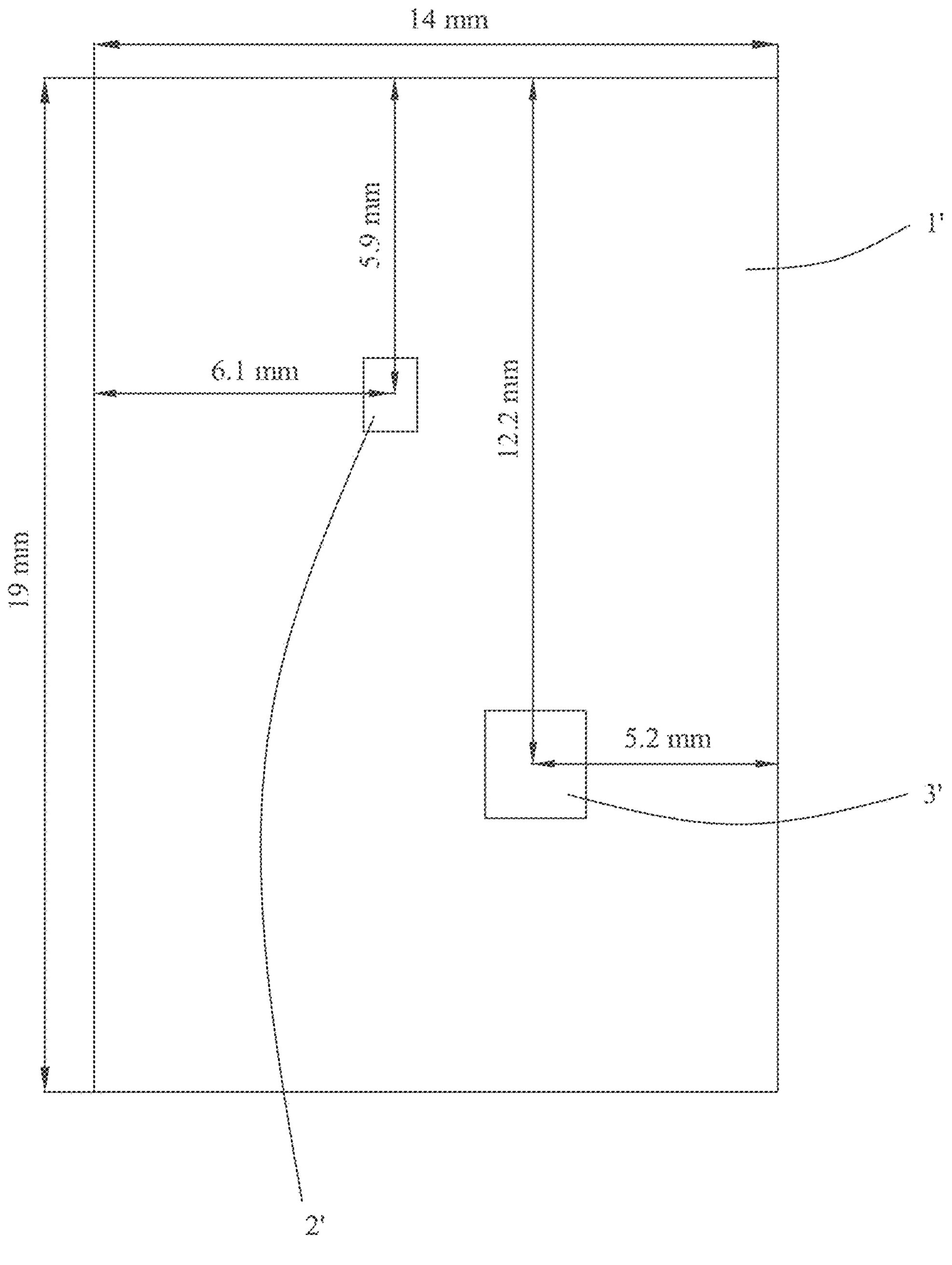
FIG. 19 is a schematic diagram of a structure of yet another patch antenna.

FIG. 19 is a schematic diagram of a structure of yet another patch antenna 1'. The patch antenna 1' is, for example, a rectangle, and has a length and a width of 14 mm*19 mm. A ground point 2' is, for example, disposed on upper left of a middle part of the patch antenna 1' shown in the figure. A feed point 3' is biased and uses capacitive feeding, for example, disposed on lower right of the middle part of the patch antenna 1' shown in the figure. Further, a 0.5 pF capacitor and a 1 nH inductor are connected in series to the feed point 3'. The patch antenna 1' generates currents spread around from the ground point, and a C mode of the patch antenna is activated. The patch antenna has transverse currents and longitudinal currents, and an operating frequency is 2.4 GHz.

Figure 20:
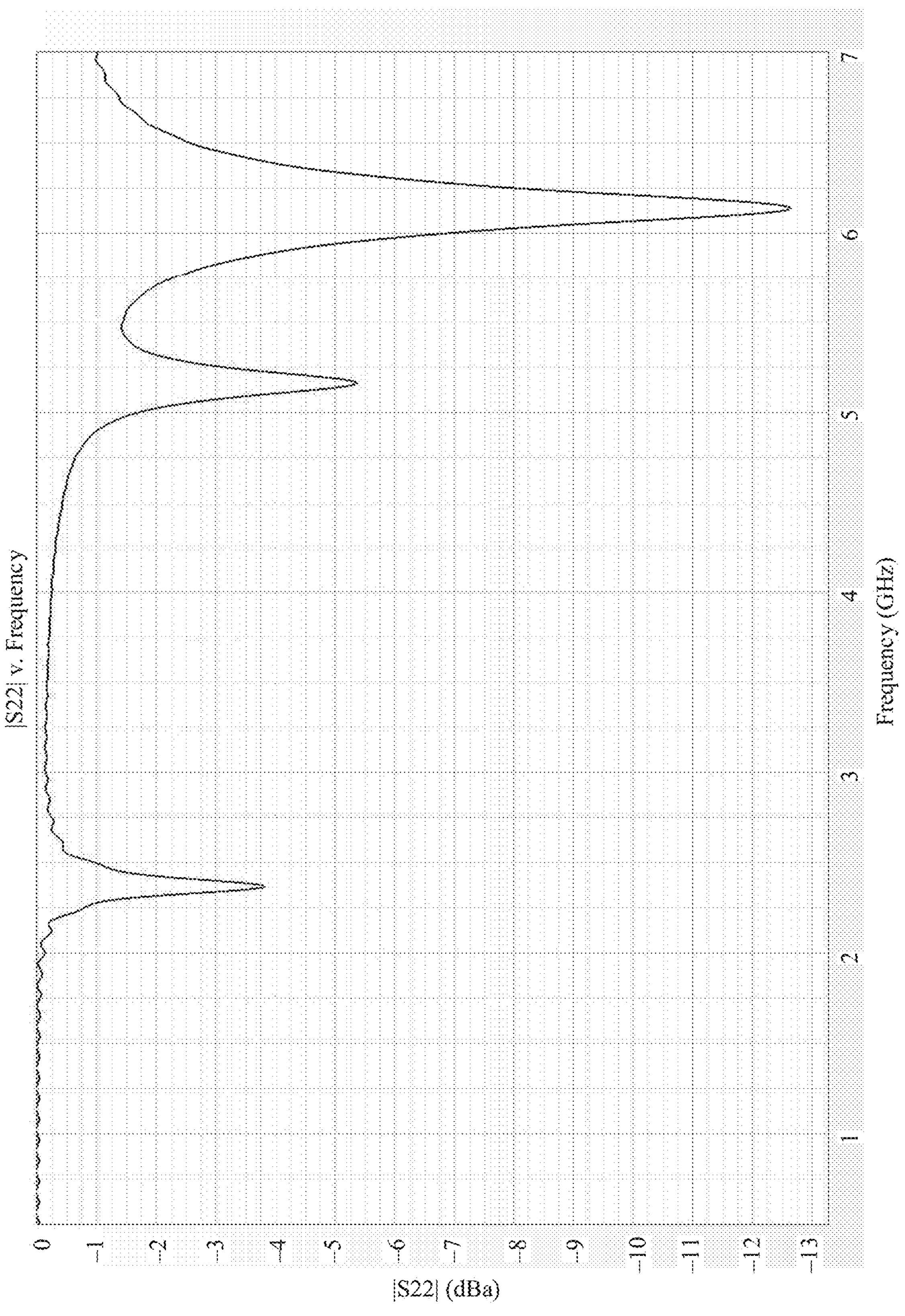
FIG. 20 is a schematic diagram of S11 of the patch antenna shown in FIG. 19.
Figure 21:
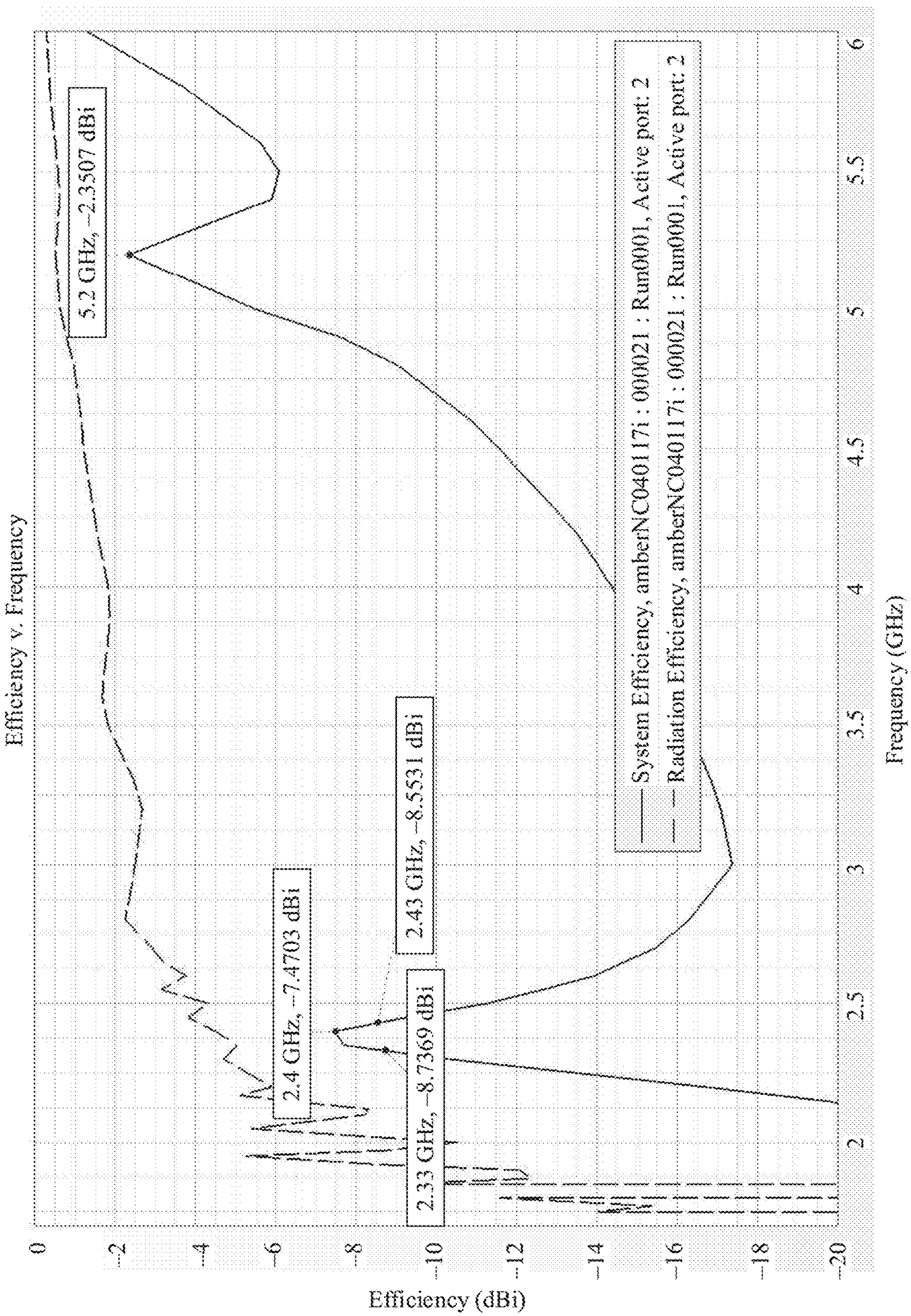
FIG. 21 is a schematic diagram of efficiency of the patch antenna shown in FIG. 19.
Figure 22:
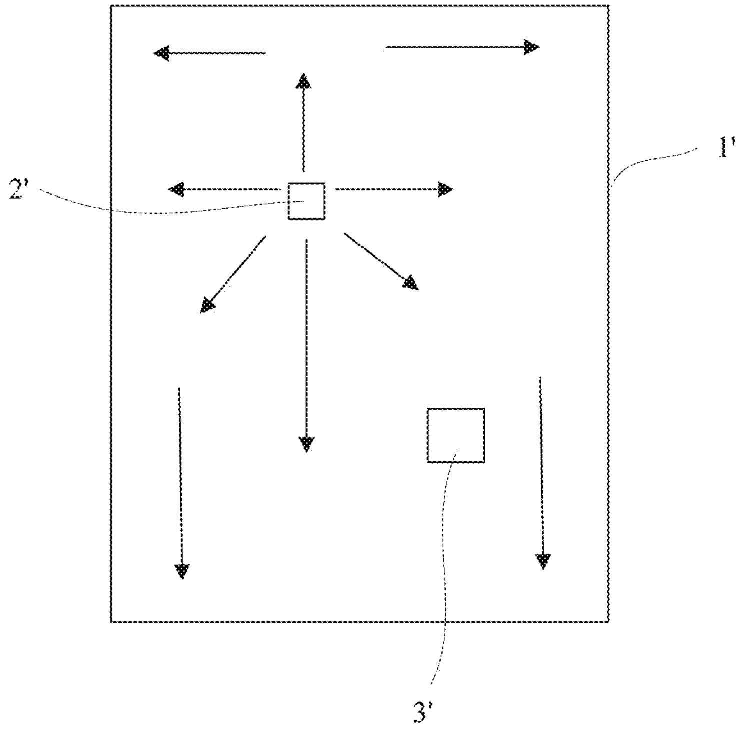
FIG. 22 is a schematic diagram of current distribution of the patch antenna shown in FIG. 19.
Figure 23:
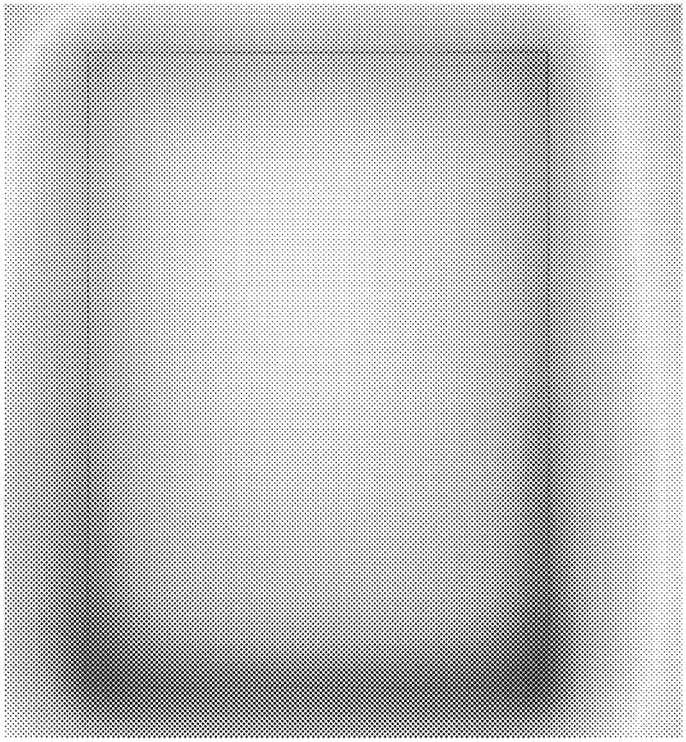
FIG. 23 is a schematic diagram of electric field distribution of the patch antenna shown in FIG. 19.
Figure 24A:
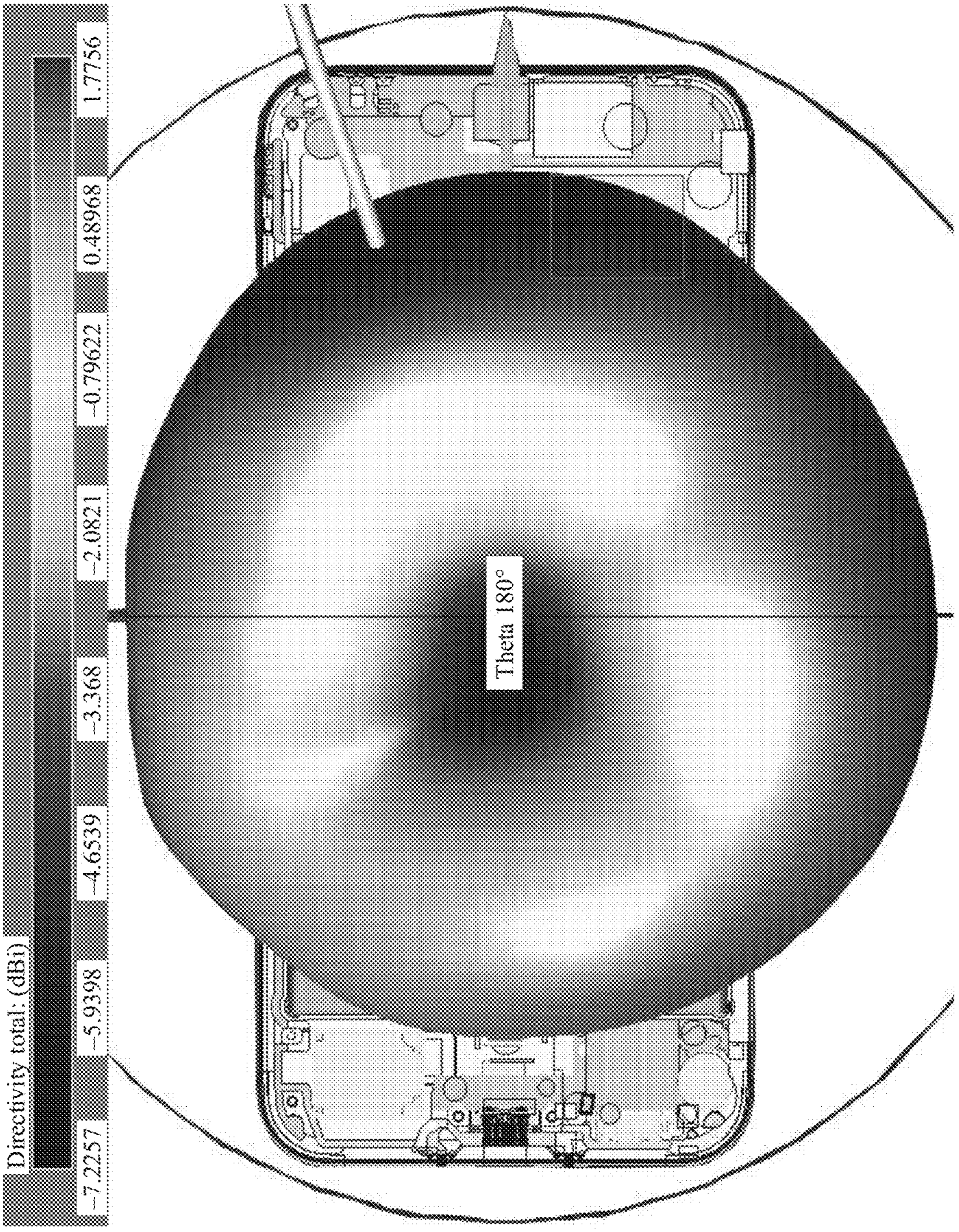
FIG. 24(*a*) and FIG. 24(*b*) are directivity patterns of the patch antenna shown in FIG. 19.
Figure 24B:
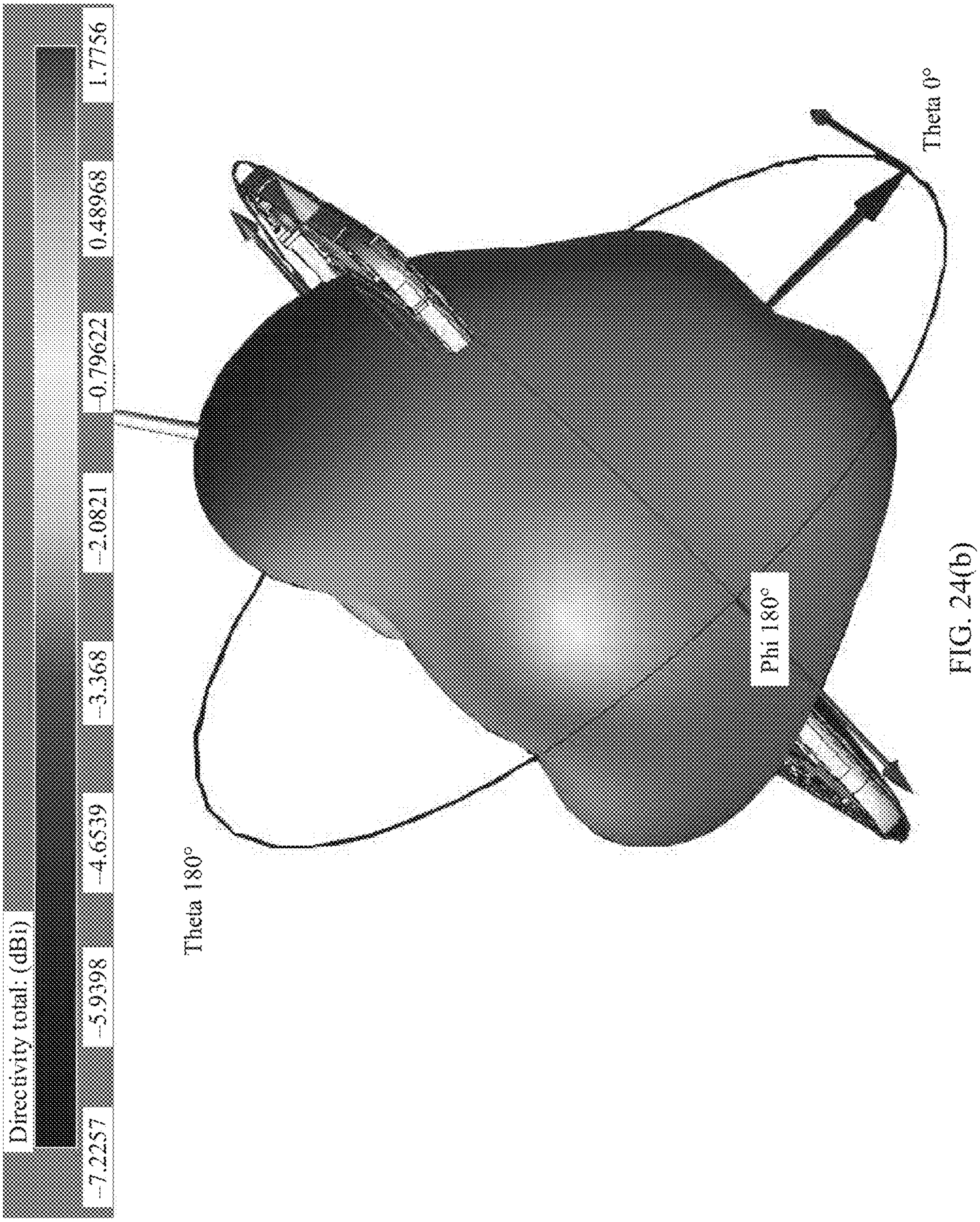

S11 and efficiency generated by the patch antenna are respectively shown in FIG. 20 and FIG. 21. FIG. 22 is a current distribution diagram of the patch antenna in FIG. 19. An arrow direction in the figure represents a current direction. It can be learned from the figure that transverse currents and longitudinal currents are generated. FIG. 23 is an electric field distribution diagram of the patch antenna in FIG. 19. It can be learned from the figure that an electric field on a lower side of the patch antenna is the strongest. FIG. 24(*a*) and FIG. 24(*b*) are directivity patterns of different angles of view. Directivity of the patch antenna in FIG. 19 may be read from the diagrams. The following Table 4 shows parameter values of the patch antenna shown in FIG. 19.

Table 4 Shows Parameter Values of the Patch Antenna Shown in FIG. 19

| | | |
|---|---|---|
| Input power 24 dBm | Resonance frequency | 2.4 GHz |
| | | 10 g |
| | FS simulation efficiency | −7.4 |
| Body SAR | 5 mm backside | 1.67 |
| Normalized efficiency | | −5 |
| Normalized body SAR | 5 mm backside | 2.90 |

Only one ground point 2' needs to be disposed for the patch antenna, and a C mode of the patch antenna is activated. The C mode has both transverse currents and longitudinal currents. Referring to FIG. 22, because a diameter of the patch antenna is too small, a −8.6 dB efficiency bandwidth covers 100 MHz, an SAR value of the patch antenna is high (2.9), a directivity pattern is omnidirectional, and directivity is very low (1.7). Efficiency may be read from FIG. 21, and directivity may be read from FIG. 24(*a*) and FIG. 24(*b*).

The foregoing patch antennas can activate the C mode and the D mode. However, this application mainly uses the C mode as an example for description.

An embodiment of this application discloses an antenna. The antenna is a patch antenna. The patch antenna may be disposed on a support, for example, on a sheet dielectric, and includes a patch radiator, a feed point, and at least two ground points. The ground points are disposed on the patch radiator at intervals, and a distance between each ground point and a side of the patch antenna is greater than or equal to 0.05λ. λ is an operating wavelength of the patch antenna in an operating frequency band of the patch antenna. For example, λ is an operating wavelength corresponding to a center frequency point in the operating frequency band, or λ is a maximum wavelength in the operating frequency band.

In the antenna in this application, at least two ground points are disposed at an interval, and a distance between each ground point and a side of the patch antenna is greater than or equal to 0.05λ, so that the patch antenna operates in a C mode and has both transverse currents and longitudinal currents. For example, currents on the patch antenna may be spread around, to form an omnidirectional pattern, reduce a directivity coefficient, and enable the patch antenna to have advantages such as a low SAR and high efficiency.

Figure 25:
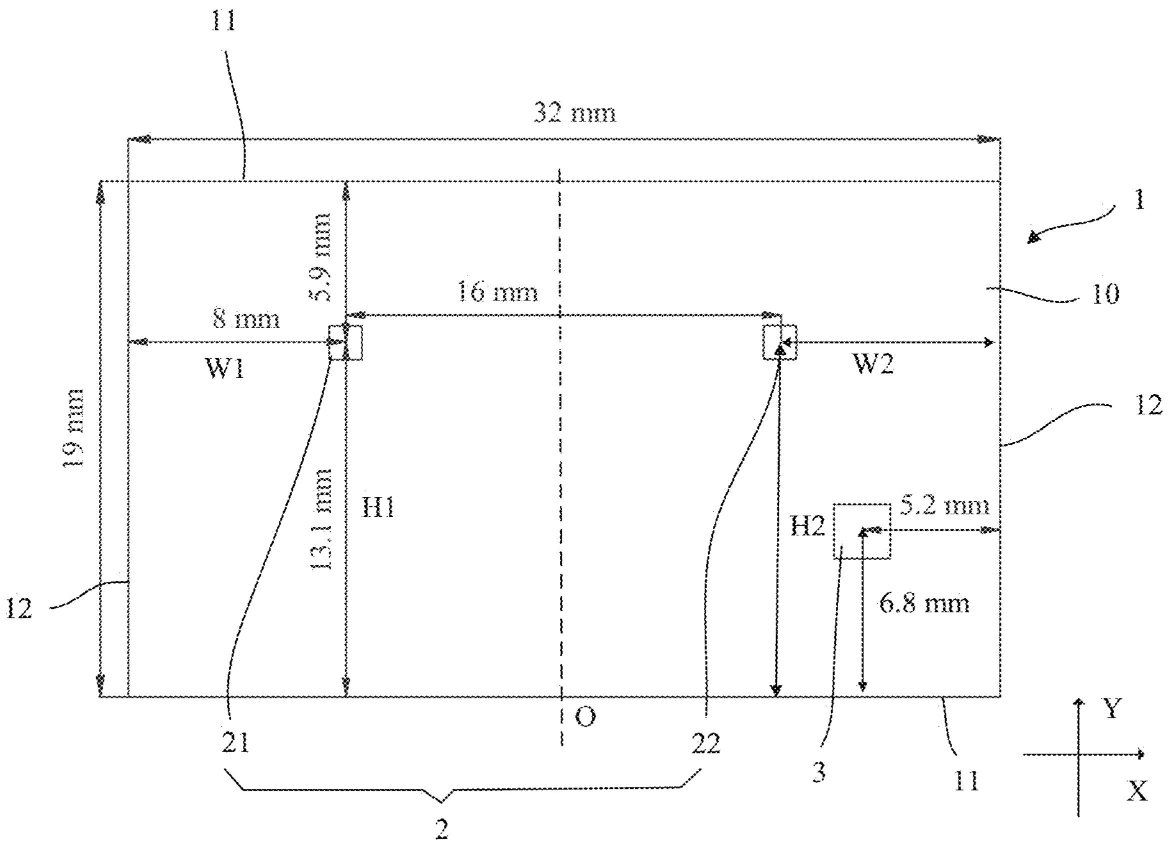
FIG. 25 is a schematic diagram of a structure of a patch antenna according to an embodiment of this application.

FIG. 25 is a schematic diagram of a structure of a patch antenna according to an embodiment of this application. This embodiment of this application discloses a specific implementation. In this embodiment, a patch antenna 1 may be, for example, a rectangular structure, and includes a patch radiator 10. The patch radiator 10 is a radiator of the patch antenna. The patch radiator 10 has two first side edges 11 and two second side edges 12. The two first side edges 11 are disposed opposite to each other, the two second side edges 12 are disposed opposite to each other, the first side edge 11 intersects with the second side edges 12, and a length of the first side edge 11 is greater than a length of the second side edge 12. Ground points 2 include a first ground point 21 and a second ground point 22, and the first ground point 21 and the second ground point 22 are distributed at intervals on the patch radiator 10 along a first direction. The first direction may be an extension direction of the first side edge 11, for example, an X direction shown in the figure. It should be understood that the "extension direction of a side edge" mentioned in this specification may be a direction parallel to the extension direction of the side edge (for example, the first side edge 11), or may be a direction that forms an included angle with the extension direction of the side edge. The included angle may be within ±30°, or within ±15°, or within t5°, as long as the first ground point 21 is disposed close to one second side edge 12 compared with the second ground point 22, and the second ground point 22 is disposed close to the other second side edge 12 compared with the first ground point 21. It may be understood that the first ground point 21 and the second ground point 22 are distributed/disposed at an interval along the extension direction of the first side edge 11. Relative to the disposition directions of the first ground point 21 and the second ground point 22, a feed point 3 (a position at which the antenna is connected to a feeder line is referred to as a feed point, and the feeder is a connection line between an antenna and a receiver) is disposed at a lower right side of the patch radiator 10 in FIG. 25. The feed point 3 is biased. In an embodiment, the feed point 3 may use direct feeding or capacitive feeding (for example, the feed point 3' is indirectly coupled to the feeder line, or a capacitor is connected in series between the feed point 3' and the feeder line). In an embodiment, a 0.3 pF capacitor and a 1 nH inductor are connected in series to the feed point 3.

Specifically, a distance between the first ground point 21 and the second side edge 12 that is closer to the first ground point 21 is W1, and a distance between the first ground point 21 and one of the first side edges 11 is H1. A distance between the second ground point 22 and the second side edge 12 that is closer to the second ground point 22 is W2, and a distance between the second ground point 22 and one of the first side edges 11 is H2. $0.25 \le W1+H1 \le 0.59$, and $0.25 \le W2+H2 \le 0.5\lambda$, so that the transverse and longitudinal currents in the C mode are activated on the patch antenna 1. In an embodiment. W1, W2, H1, and H2 further satisfy: W1=W2 and/or H1=H2, so that the first ground point 21 and the second ground point 22 are symmetrically distributed on two sides of a central axis of the patch antenna in the first direction or a second direction, so that the patch antenna better activates transverse currents and longitudinal currents, to implement the patch antenna with a low SAR and low directivity. The central axis of the patch antenna may be an O-axis in FIG. 25, and the central axis may be a rectangular central line around a periphery of the patch antenna in a Y direction. In another embodiment, W1, W2, H1, and H2 further satisfy. W1=W2 and H1=H2. For example, the first ground point 21 and the second ground point 22 are distributed on two sides of the central axis of the patch antenna 1 in a mirror-symmetric manner, so that transverse and longitudinal currents are better activated on the patch antenna, directivity is further reduced, an SAR value is further reduced, and system efficiency is improved.

In this application, a disposition position of the first ground point 21 meets a requirement of $0.25\lambda \le W1+H1 \le 0.5\lambda$, a disposition position of the second ground point 22 meets a requirement of $0.25\lambda \le W2+H2 \le 0.5\lambda$, and W1=W2, so that the patch antenna 1 can receive a required frequency band, for example, a frequency band between 2.4 G and 2.5 G. and has features of low directivity and a low SAR.

Further, the length of the first side edge 11 is less than 0.5λ, the length of the second side edge 12 is less than 0.5λ, and in the first direction, a distance between the first ground point 21 and the second ground point 22 is greater than 0.1λ.

In this embodiment, only two ground points are disposed. It may be understood that in another embodiment, three or more ground points may be disposed. When three or more ground points are disposed, the first ground point 21 and the second ground point 22 may be correspondingly adjusted in a condition that 0.25λ≤W1+H1≤0.5λ, and 0.25λ≤W2+H2≤0.5λ. Other ground points are evenly disposed between the first ground point and the second ground point in the first direction, and additional ground points may not be evenly disposed between the first ground point and the second ground point in the first direction.

In this embodiment, the patch antenna 1 may operate on a 2.45 GHz frequency band. The length of a first side edge 11 of the patch antenna 1 is 32 mm, the length of the second side edge 12 is 19 mm, the distance between the first ground point 21 and the second side edge 12 closer to the first ground point 21 is 8 mm, the distance between the second ground point 22 and the second side edge 12 closer to the second ground point 22 is 8 mm, and distances between the first ground point 21 and the second ground point 22 and one of the first side edges 11 are 13.1 mm. It may be understood that, in another embodiment, a length of each side of the patch antenna 1 may alternatively be another value, but the length of each side is required to be less than 0.5λ. The distance between the first ground point 21 and the second side edge 12 and the distance between the second ground point 22 and the second side edge 12 may alternatively be another value. The distance between the first ground point 21 and the first side edge 11 and the distance between the second ground point 22 and the first side edge 11 may alternatively be another value. However, a sum of the distance between the first ground point 21 and one second side edge 12 closer to the first ground point 21 and the distance between the first ground point 21 and one of the first side edges 11 is within a range of 0.25λ to 0.5λ, and a sum of the distance between the second ground point 22 and one second side edge 12 closer to the second ground point 22 and a distance between the second ground point 22 and one of the first side edges 11 is within a range of 0.25λ to 0.5λ.

For example, in FIG. 25, a sum of a distance between the first ground point 21 and a first side edge 11 on a left side and a distance between the first ground point 21 and a first side edge 11 on a lower side are within a range of 0.25λ to 0.5λ, and a sum of a distance between the second ground point 22 and a first side edge 11 on a right side and a distance between the second ground point 21 and a first side edge 11 on the lower side are within a range of 0.25λ to 0.5λ.

In this embodiment, the feed point 3 is located at a lower right corner of the patch radiator 10. Specifically, a distance between the feed point 3 and one of the second side edges 12 is 5.2 mm, and a distance between the feed point 3 and one of the first side edges 11 is 6.8 mm. It may be understood that in another embodiment, the feed point 3 may alternatively be disposed at another position of the patch radiator 10, for example, located in a middle part of the patch radiator 10, or near the first ground point 21.

In this embodiment of this application, for example, in the embodiment shown in FIG. 25, the first ground point 21 and the second ground point 22 are disposed on the patch radiator. It may be understood that in another embodiment shown in FIG. 28, the patch radiator 10 has a first coupling contact 23 and a second coupling contact 24, the first ground point is coupled to the patch radiator through the first coupling contact 23, and grounds the patch radiator, and the second ground point is coupled to the patch radiator through the second coupling contact 24, and grounds the patch radiator. In this embodiment, reference numerals 21 and 22 shown in FIG. 25 may be used to represent the first coupling contact and the second coupling contact, but the first ground point and the second ground point are not shown in the figure FIG. 25. The foregoing descriptions of the first ground point and the second ground point are also applicable to the first coupling contact 23 and the second coupling contact 24. Details are not described herein again. In a specific embodiment, the first coupling contact is directly coupled to the first ground point, and the second coupling contact is directly coupled to the second ground point. Direct coupling may be, for example, a direct electrical connection through a connection line. In another specific embodiment, the first coupling contact is indirectly coupled to the first ground point, and the second coupling contact is indirectly coupled to the second ground point. Indirect coupling may be, for example, an indirect electrical connection that is spaced at a specific distance without contact.

In this embodiment, the patch antenna is rectangular. It may be understood that in another embodiment, the patch antenna may alternatively be a square, a rhombus, or a circle.

Figure 26:
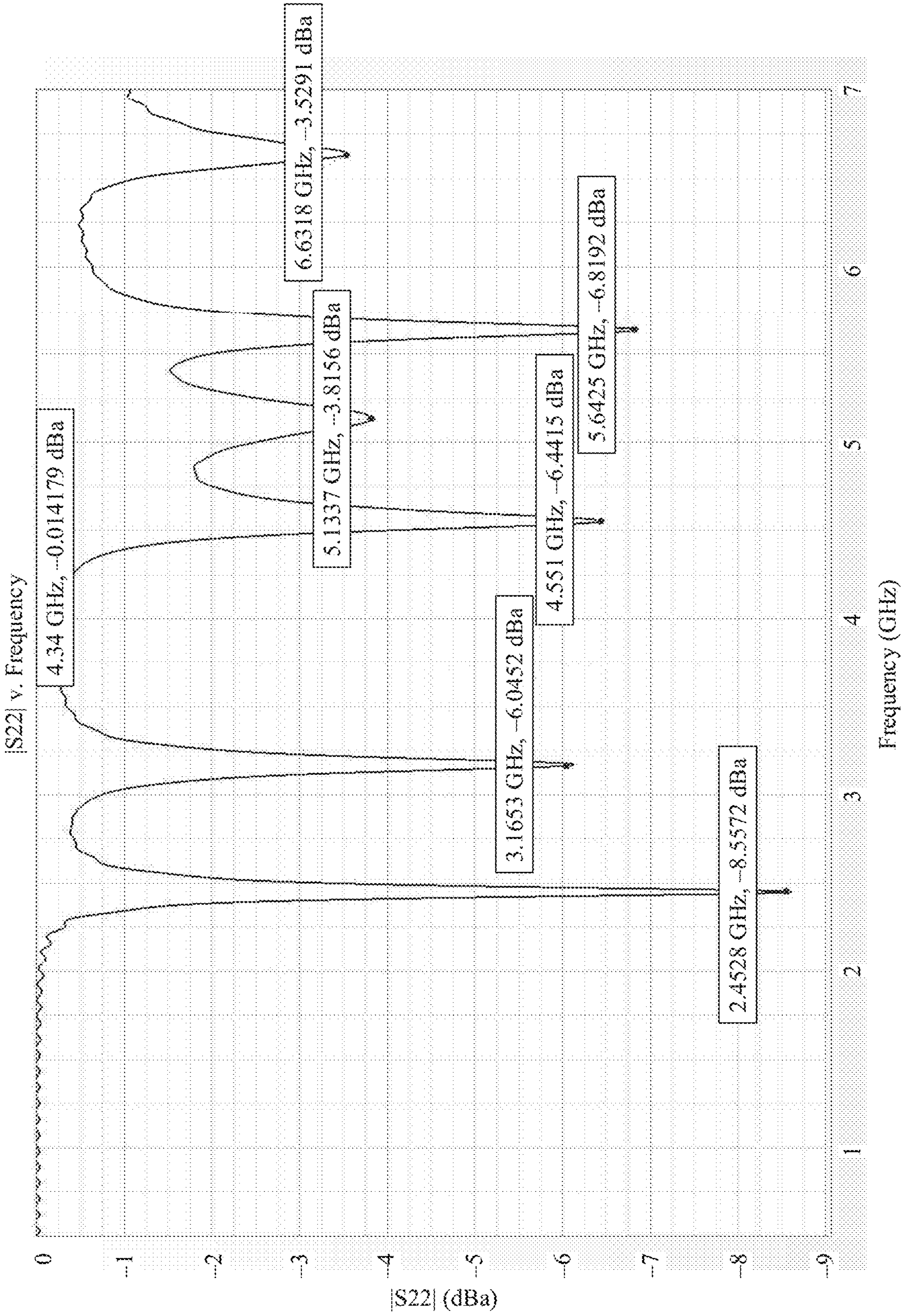
FIG. 26 is a schematic diagram of S11 of the patch antenna shown in FIG. 25.
Figure 27:
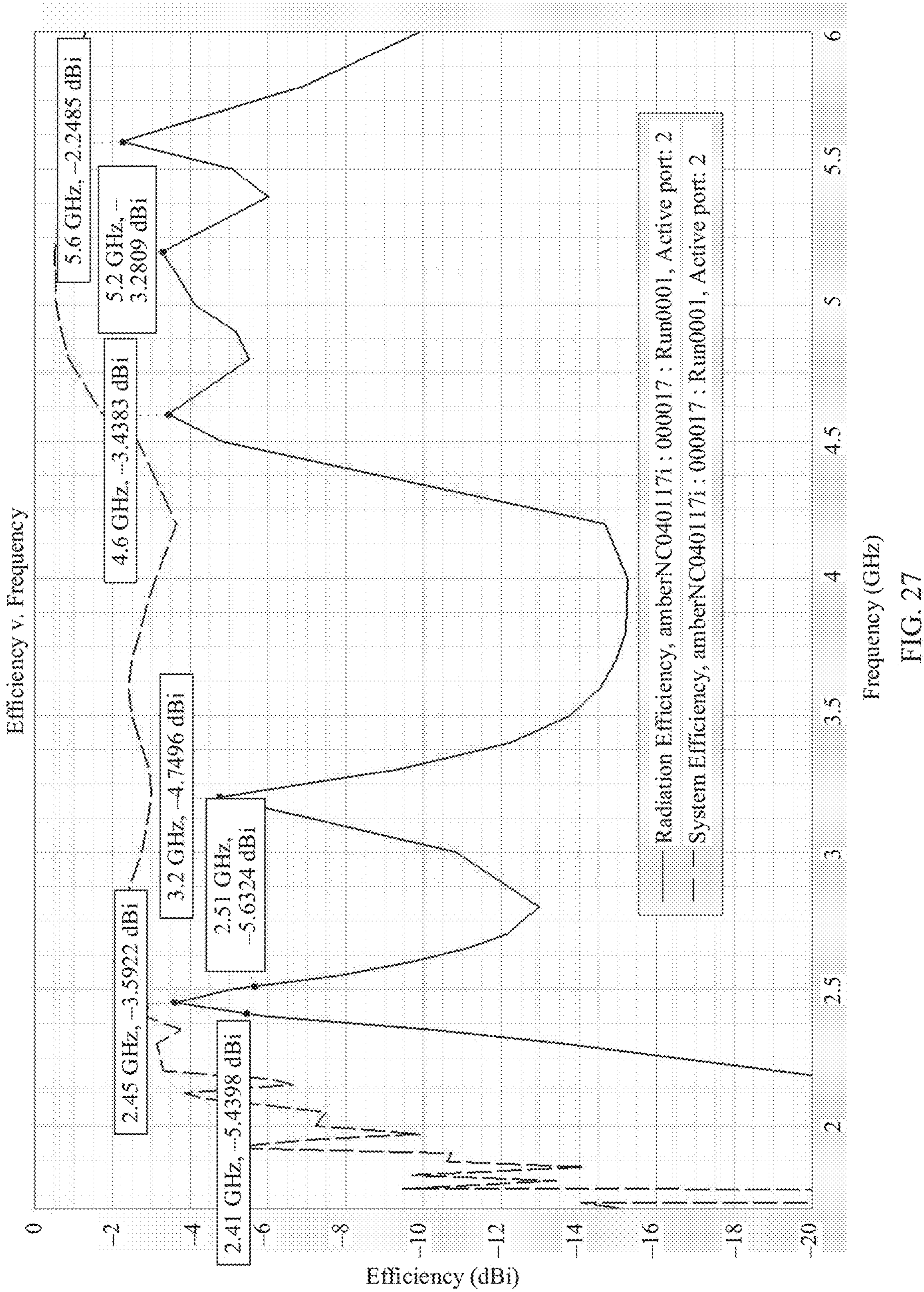
FIG. 27 is a schematic diagram of efficiency of the patch antenna shown in FIG. 25.
Figure 28:
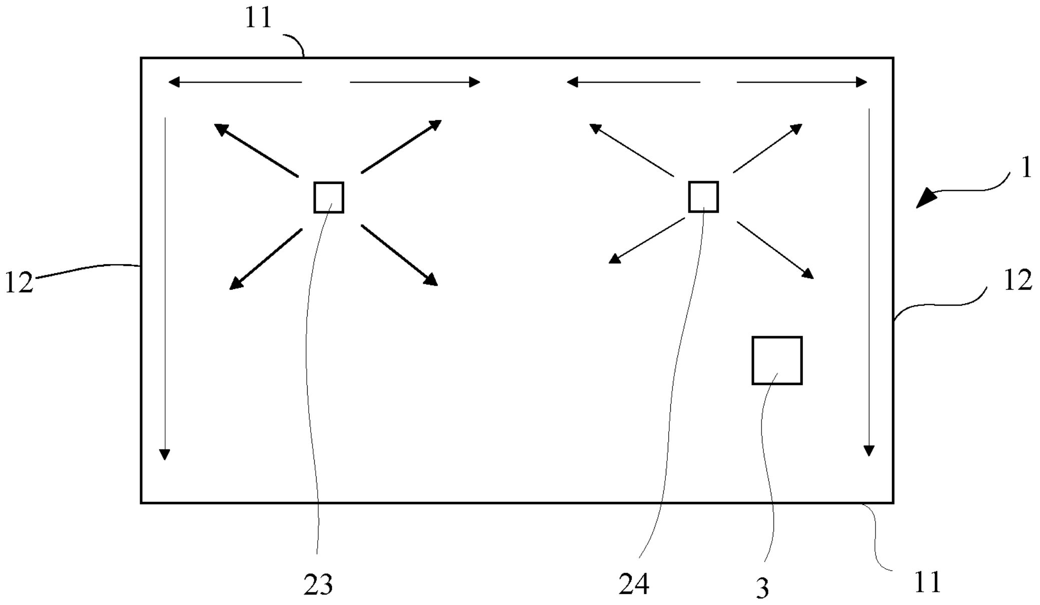
FIG. 28 is a schematic diagram of current distribution of the patch antenna shown in FIG. 25.
Figure 29:
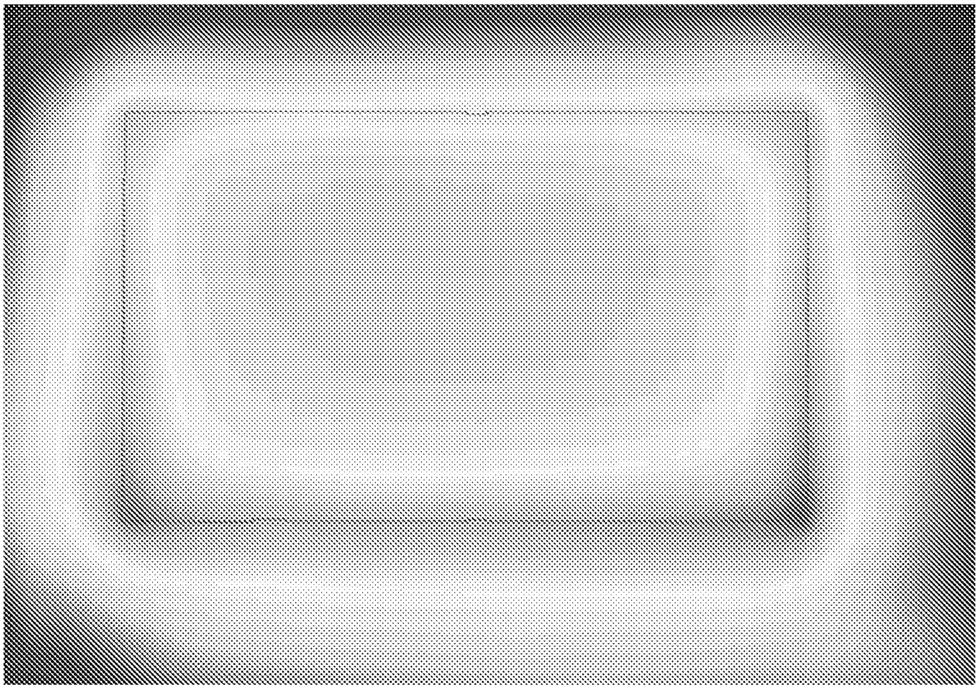
FIG. 29 is a schematic diagram of electric field distribution of the patch antenna shown in FIG. 25.
Figure 30A:
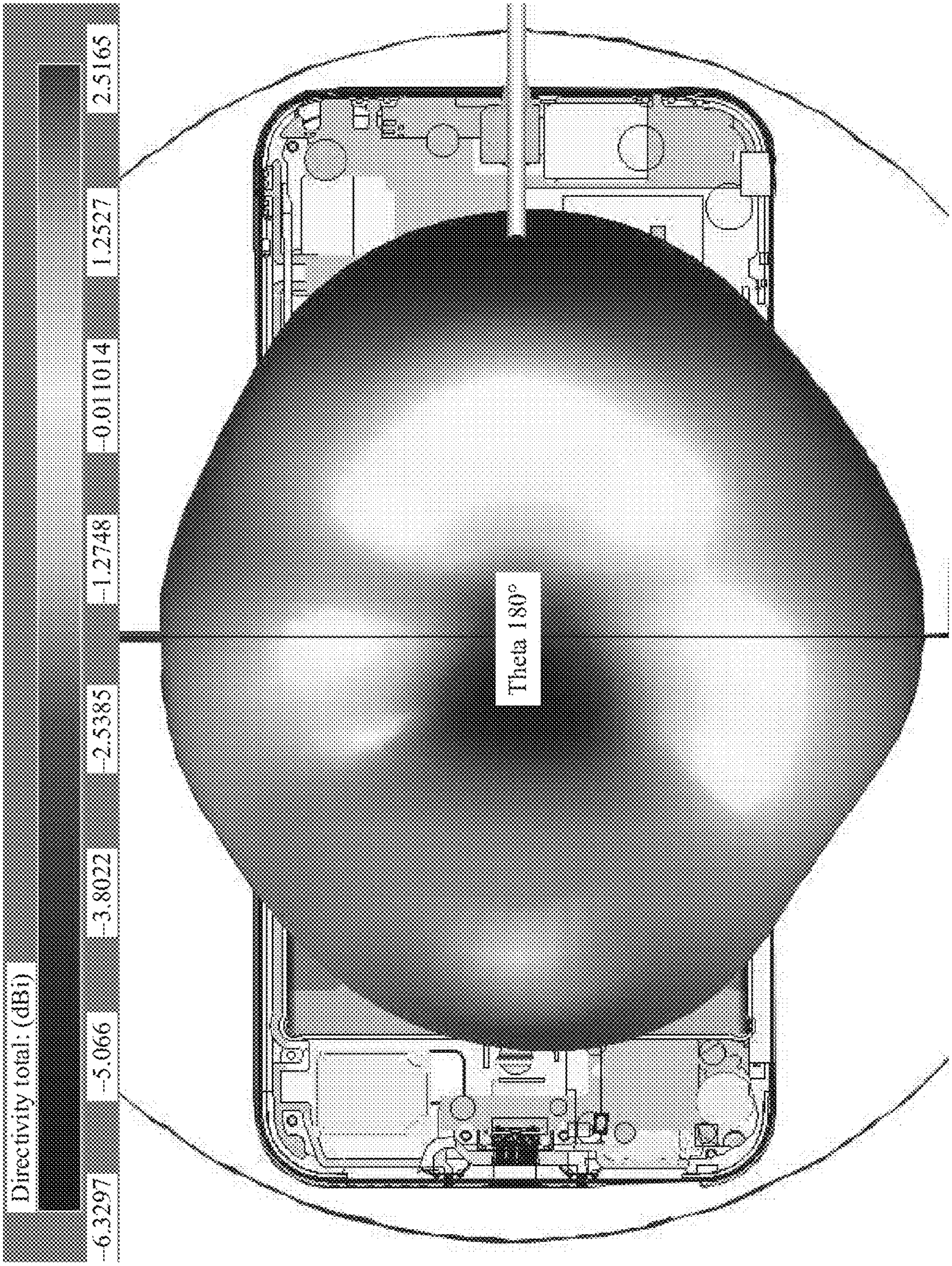
FIG. 30(*a*) and FIG. 30(*b*) are directivity patterns of the patch antenna shown in FIG. 25.
Figure 30B:
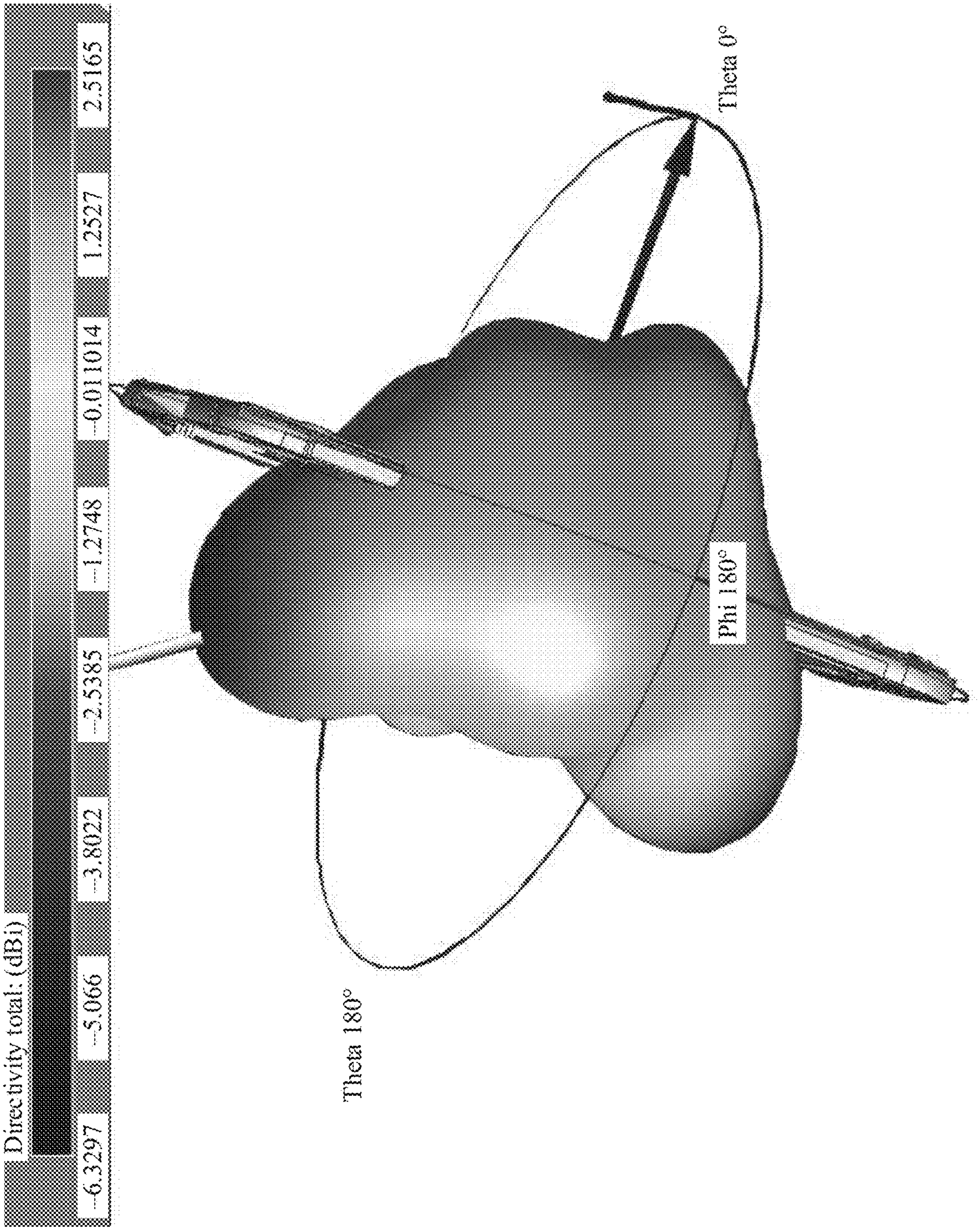

S11 and efficiency generated by the patch antenna in this embodiment are respectively shown in FIG. 26 and FIG. 27. FIG. 28 is a current distribution diagram of the patch antenna in FIG. 25. An arrow direction in the figure represents a current direction. It can be learned from the figure that the patch antenna generates currents spread around. FIG. 29 is an electric field distribution diagram of the patch antenna in FIG. 25. It can be learned from the figure that an electric field on a lower side of the patch antenna is the strongest. FIG. 30(*a*) and FIG. 30(*b*) are directivity patterns of different angles of view. Directivity of the patch antenna in FIG. 25 may be read from the diagrams. The following Table 5 shows parameter values of the patch antenna shown in FIG. 25.

Table 5 Shows Parameter Values of the Patch Antenna Shown in FIG. 25

| | | |
|---|---|---|
| Input power 24 dBm | Resonance frequency | 2.45 GHz |
| | | 10 g |
| | FS simulation efficiency | −3.6 |
| Body SAR | 5 mm backside | 1.72 |
| Normalized efficiency | | −5 |
| Normalized body SAR | 5 mm backside | 1.25 |

In this embodiment, two ground points 2 are disposed, and a C mode of the patch antenna is activated, and the patch antenna has transverse and longitudinal currents. A −5.6 dB efficiency bandwidth covers 100 MHz, an SAR value of the patch antenna is low (1.25), and directivity is very low (2.5). An efficiency value may be read from FIG. 27, and the directivity may be read from FIG. 30(*a*) and FIG. 30(*b*). It can be learned from Table 5 that when the normalized efficiency is −5, a value of the normalized body SAR is 1.25.

Based on the foregoing embodiment, this application further discloses a specific implementation. In this embodiment, the patch antenna is a square, and the ground points may be distributed on the patch radiator at intervals in the first direction, or may be distributed in the 15 second direction (The second direction may be an extension direction of the second side edge 12, for example, a Y direction shown in the figure. It should be understood that the "extension direction of a side edge" mentioned in this specification may be parallel to the extension direction of the side edge (for example, the second side edge 12), or may be a direction that forms an included angle with the extension direction of the side edge. The included angle may be within ±30°, or within +15°, or within 5°) distributed on the patch radiator at intervals. When the ground points are distributed on the patch radiator at intervals along the first direction, distances between the first ground point and each side edge and between the second ground point and each side edge are the same as those in the foregoing embodiment. When the ground points are distributed on the patch radiator along the second direction, the first ground point 21 is closer to one of the first side edges than the second ground point 22, a distance between the first ground point 21 and the first side edge is W1', and a distance between the first ground point 21 and one of the second side edges is H1'. The second ground point 22 is closer to another first side edge than the first ground point 21, a distance between the second ground point 22 and the another first side edge is W2', and a distance between the second ground point 22 and one of the second side edges is H2', where W1'=W2', $0.25\lambda \le W1'+H1' \le 0.5\lambda$, and $0.25\lambda \le W2'+H1' \le 0.5\lambda$.

Based on the foregoing embodiment, this application further discloses a specific implementation. In this embodiment, the patch antenna further includes a switch module. The switch module is connected to each ground point, and the ground point can be connected to or disconnected from the ground by controlling connection or disconnection of the switch module. When all ground points are disconnected from the ground by using the switch module, a current on the patch antenna cannot flow to the ground from the ground point 2, and the patch antenna operates in a D mode. When both the first ground point 21 and the second ground point 22 are connected to the ground by using the switch module, a current on the patch antenna can flow to the ground from the ground point 2, and the patch antenna operates in a C mode.

Figure 31:
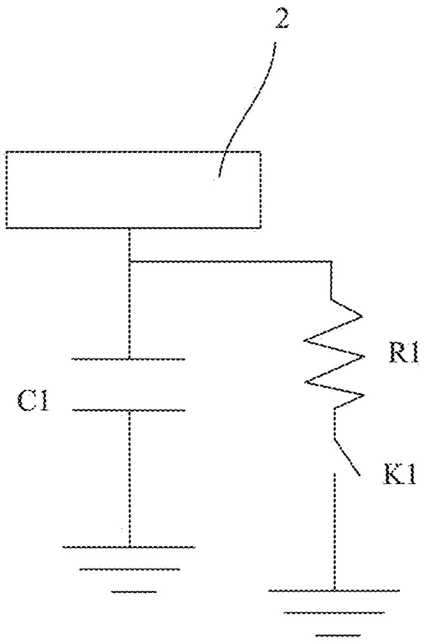
FIG. 31 is a schematic diagram of a circuit of a switch module in a patch antenna according to still another embodiment of this application.

FIG. 31 is a schematic diagram of a circuit of a switch module in a patch antenna according to still another embodiment of this application. For example, the switch module may include a capacitor C1, a resistor R1, and a switch K1, and the resistor is zero ohms. One end of the resistor R1 is connected to the ground point 2, the other end of the resistor R1 is connected to the ground by using the switch K1, one end of the capacitor C1 is connected to the ground point 2, and the other end of the capacitor C1 is connected to the ground. When the switch K1 is turned off a current at the ground point 2 can flow into the ground through the resistor R1. In this case, the patch antenna operates in the C mode. When the switch K1 is in a turned-on state, a current at the ground point 2 cannot flow into the ground. In this case, the patch antenna operates in the D mode. It may be understood that, in another embodiment, the switch module may alternatively be of another circuit structure, provided that the ground point can be controlled to be connected to or disconnected from the ground.

In this application, the switch module is disposed on the ground point, so that the switch module can control the connection or disconnection between the ground point and the ground, to implement switching between the C-mode operation and the D-mode operation mode of the patch antenna, and implement complementarity of directivity patterns of the patch antenna. Table 6 shows a switching logic of the switch module according to an embodiment of this application.

TABLE 6

Switching logic of the switch module according to an embodiment of this application

| | First switch module | Second switch module |
|---|---|---|
| C mode | 0 ohm | 0 ohm |
| D mode | 1.5 pF, 0.5 nH | 0.3 pF |

In the foregoing table, the first switch module is connected to the first ground point, so that a first route of the first ground point may be grounded by using a zero-ohm resistor, and the second route may be grounded by using a capacitor and an inductor, for example, by using a 1.5 pF capacitor and a 0.5 nH inductor. The second switch module is connected to the second ground point, so that a first route of the second ground point may be grounded by using a zero-ohm resistor, and the second route may be grounded by using a capacitor, for example, by using a 0.3 pF capacitor. When currents on the first ground point and the second ground point separately flow to the ground through the zero-ohm resistor, the patch antenna operates in the C mode. When the current on the first ground point flows only to the capacitor (for example, 1.5 pF) and the inductor (for example, 0.5 nH), and the current on the second ground point flows only to the capacitor (for example, 0.3 pF), the patch antenna operates in the D mode.

Figure 32:
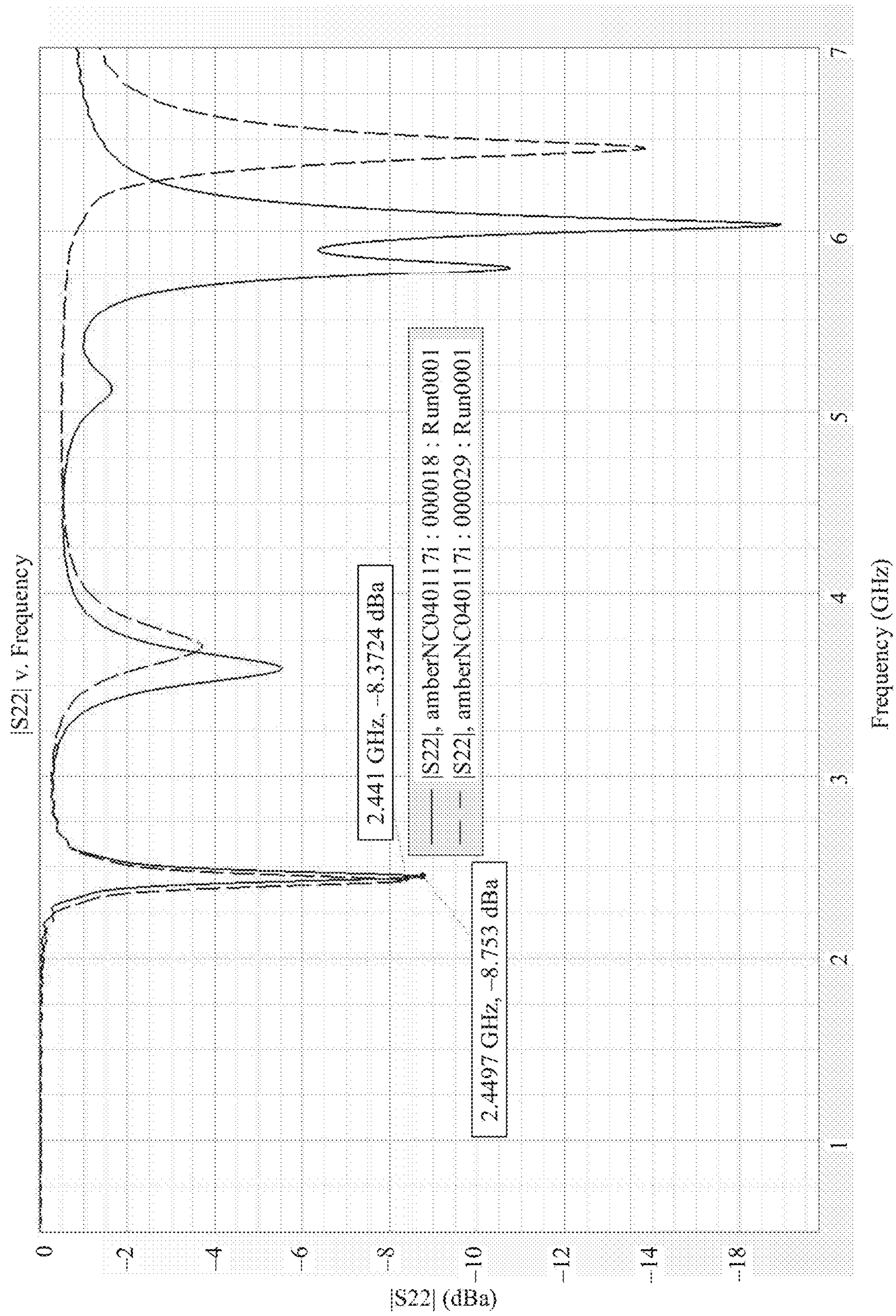
FIG. 32 is a schematic diagram of S11 of a patch antenna with a switch module.
Figure 33:
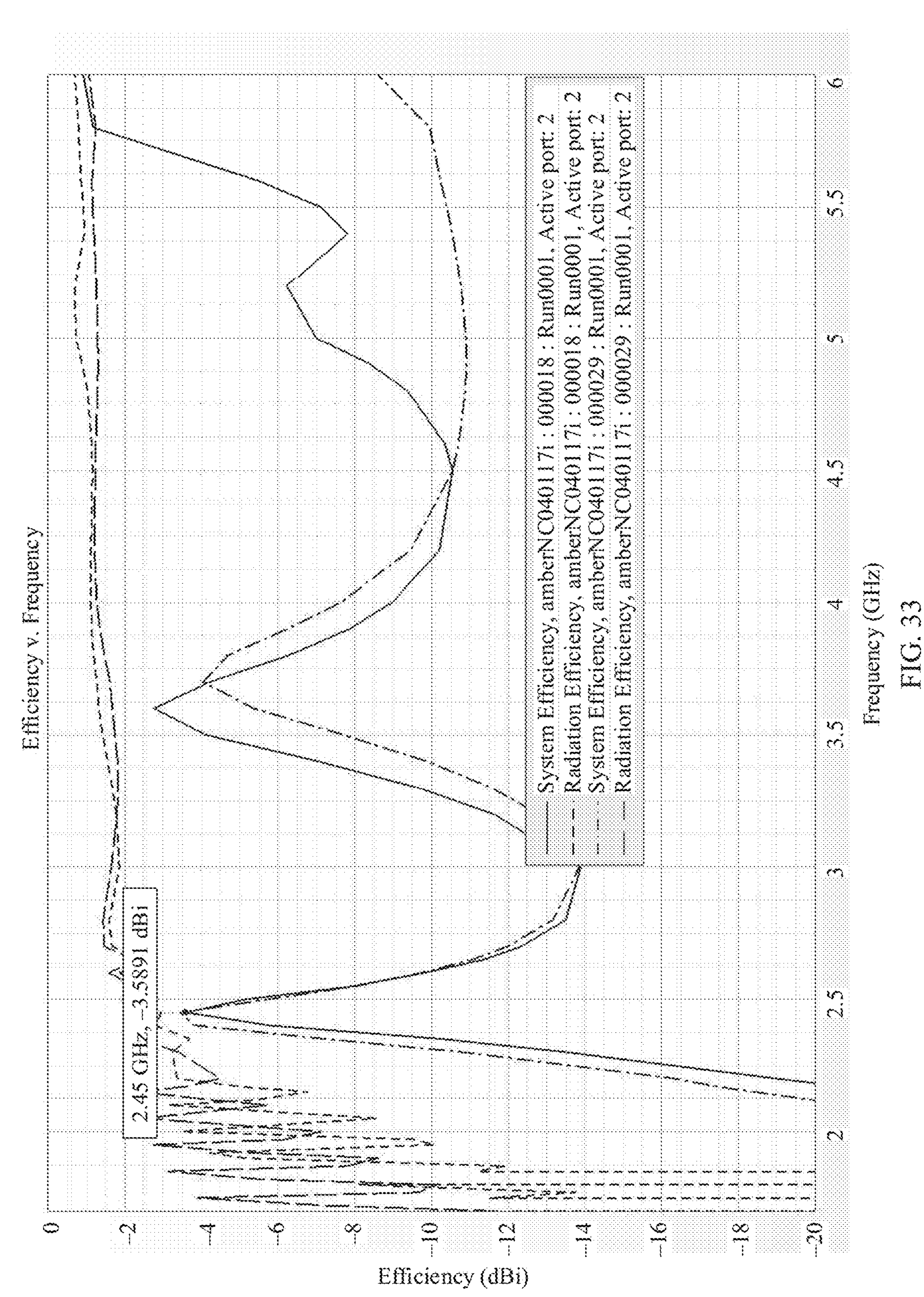
FIG. 33 is a schematic diagram of efficiency of a patch antenna with a switch module.
Figure 34:
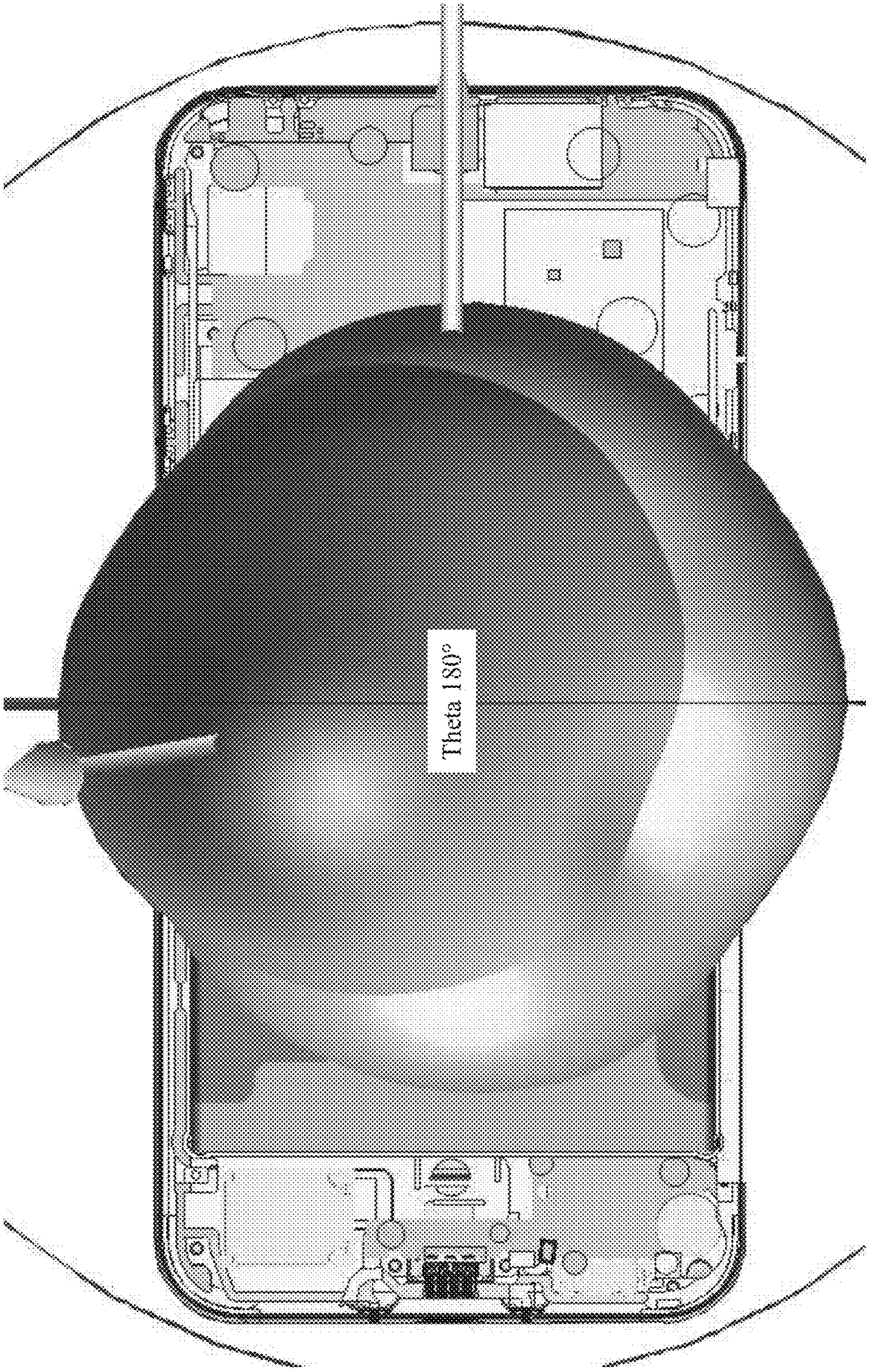
FIG. 34 is a directivity pattern of a patch antenna with a switch module.

For S11, efficiency, and a directivity pattern generated by the patch antenna in this embodiment, refer to FIG. 32, FIG. 33, and FIG. 34 respectively. In FIG. 32 and FIG. 33, a curve 000018 corresponds to the C mode, and a curve 000029 corresponds to the D mode.

Figure 35:
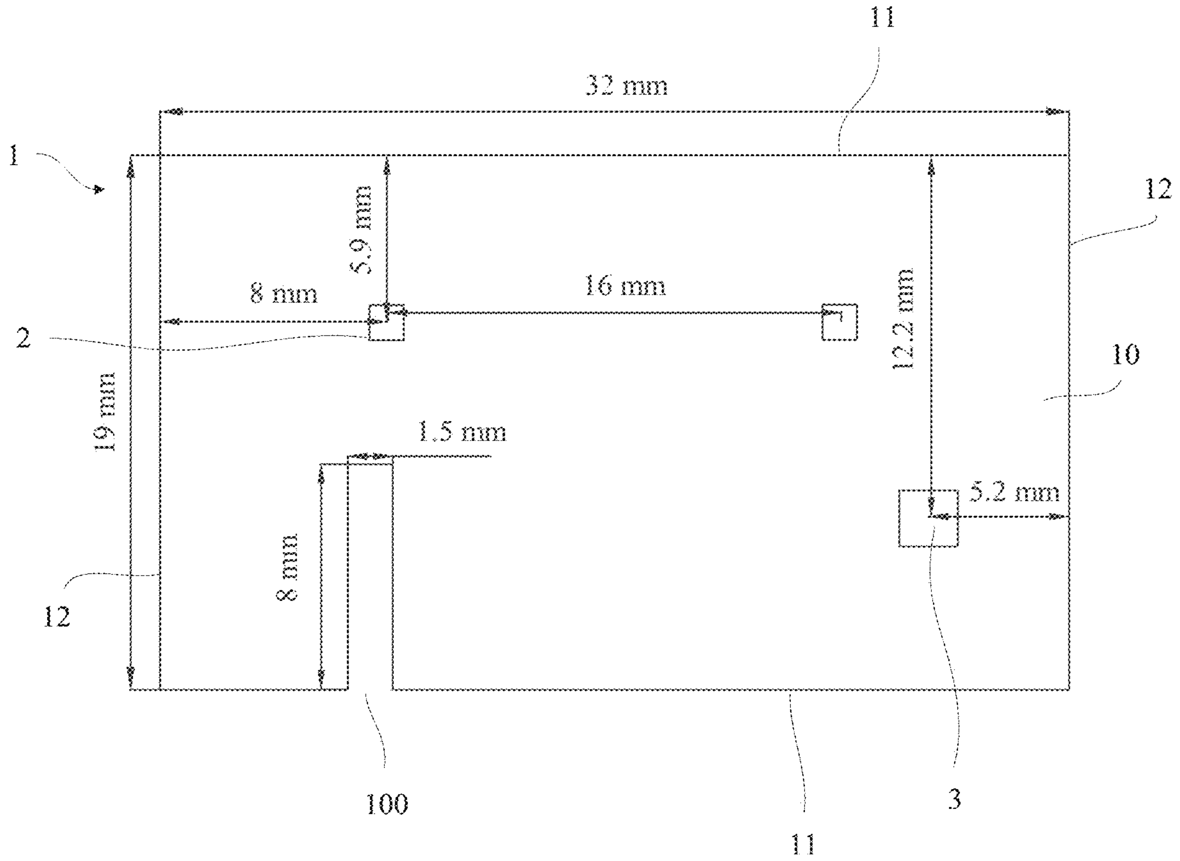
FIG. 35 is a schematic diagram of a structure of a patch antenna according to still another embodiment of this application.

Based on the foregoing embodiment, this application further discloses another specific implementation. FIG. 35 is a schematic diagram of a structure of a patch antenna according to still another embodiment of this application. In this embodiment, the patch antenna is further provided with a groove 100, and a position of the groove 100 is set based on current distribution of a resonance frequency generated by the patch antenna. For example, in this embodiment, because a current flow direction is along the extension direction of the first side edge 11, the groove 100 is provided on the first side edge 21, the groove 100 is a rectangle, and a depth of the groove 100 extends along the extension direction of the second side edge 12. Further, the groove 100 is disposed in a strong current region of the resonance frequency generated by the patch antenna, and a specific position may be obtained by simulating current distribution of the resonance. In this application, the groove 100 is disposed in the strong current region of the resonance frequency, so that a current path can be increased, and a frequency multiplication of the patch antenna can be reduced (the frequency multiplication means that a frequency of an output signal generated by the antenna is an integer multiple of a frequency of an input signal), or a resonance frequency required by the patch antenna in this application is reduced. In this application, the frequency multiplication of the D mode having transverse currents is pulled into the band, so that three-frequency directivity pattern tuning (2.4G and 5G in this example) can be implemented. Table 7 shows a switching logic of the switch module in this embodiment.

Table 7 Shows a Switching Logic of the Switch Module

| | First switch module | Second switch module |
|---|---|---|
| First state | 0 ohm | 0 ohm |
| Second state | 1 pF, 1.3 nH | 0.3 pF |
| Third state | 0.5 pF | 0.5 pF |

In the foregoing table, the first switch module is connected to the first ground point, so that there are three connection routes between the first ground point and the ground. A first connection route is that the first ground point is grounded by using the zero-ohm resistor, a second connection route is that the first ground point is grounded by using the capacitor and the inductor, for example, by using a 1 pF capacitor and a 1.3 nH inductor, and a third connection route is that the first ground point is grounded by using the capacitor, for example, by using a 0.5 pF capacitor. The second switch module is connected to the second ground point, so that there are three connection routes between the second ground point and the ground. A first connection route is that the second ground point is grounded by using the zero-ohm resistor, a second connection route is that the second ground point is grounded by using the capacitor, for example, by using a 0.3 pF capacitor, and a third connection route is that the second ground point is grounded by using the capacitor, for example, by using a 0.5 pF capacitor. When currents on the first ground point and the second ground point flow into the ground through the zero-ohm resistor, the patch antenna is in a first state. When the current on the first ground point flows to the capacitor (for example, 1 pF) and the current on the second ground point flows to the capacitor (for example, 0.3 pF), the patch antenna is in a second state. When the currents on the first ground point and the second ground point flow to the capacitor (for example, 0.5 pF), the patch antenna is in a third state.

Figure 36:
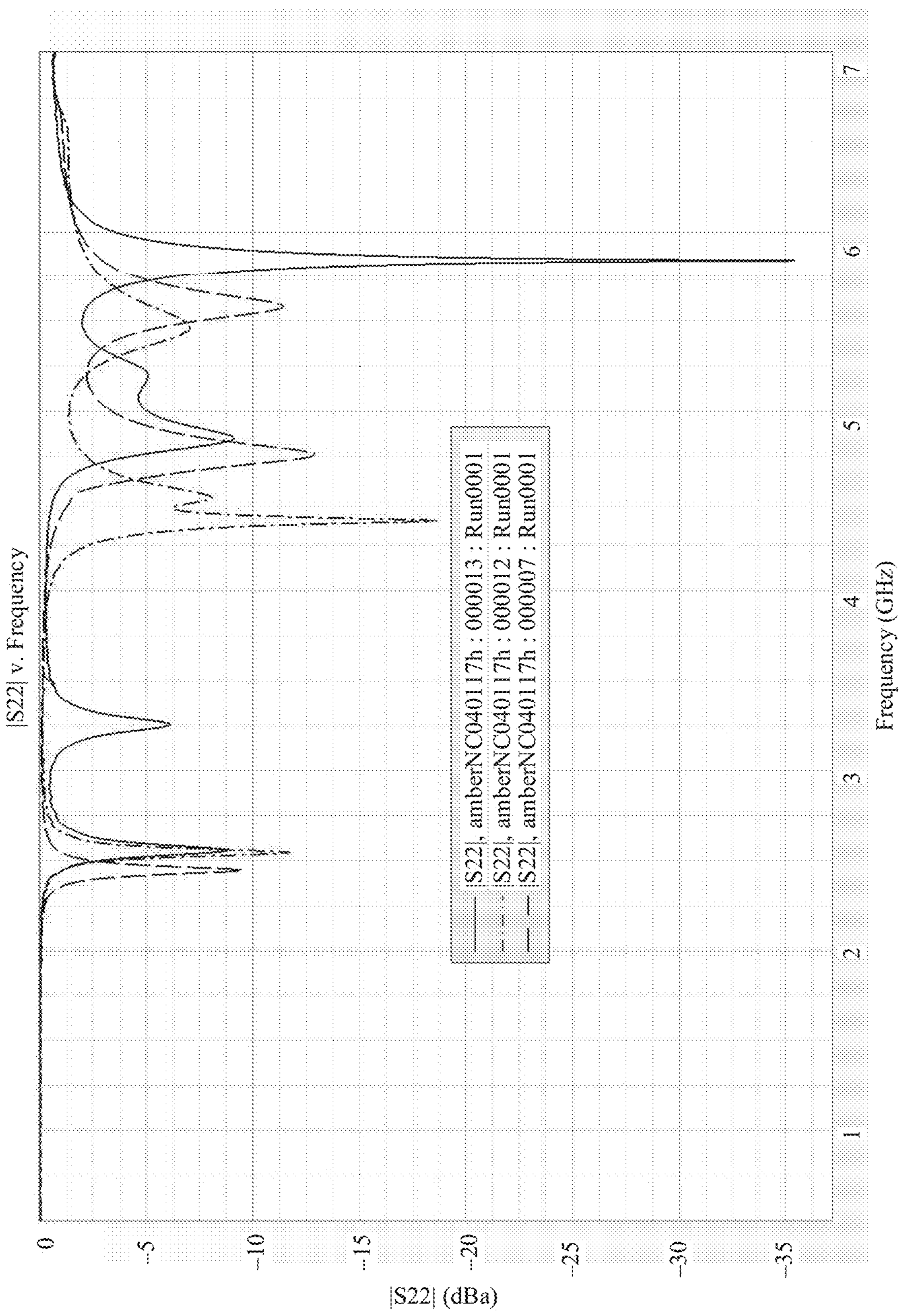
FIG. 36 is a schematic diagram of S11 of the patch antenna shown in FIG. 35.
Figure 37:
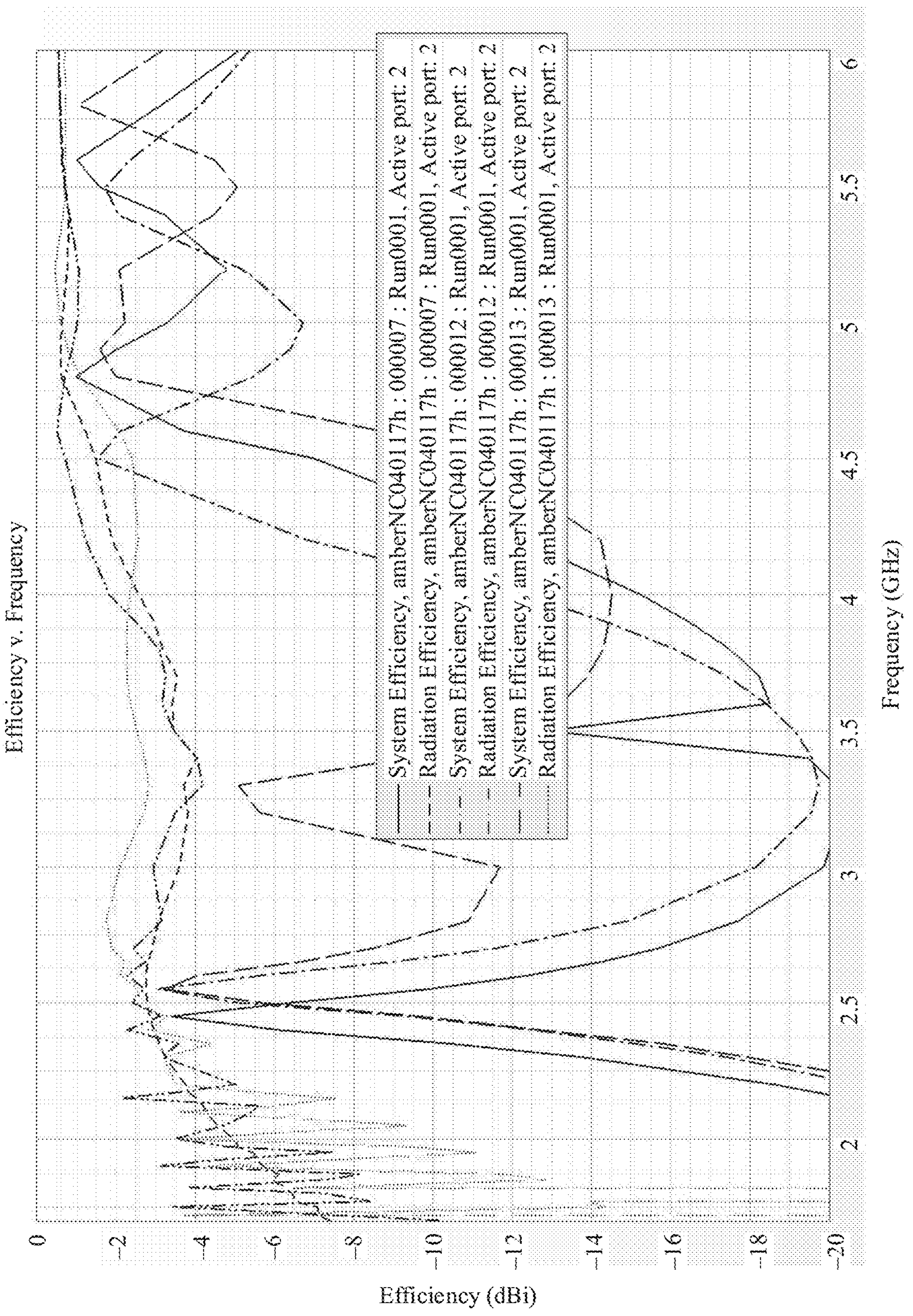
FIG. 37 is a schematic diagram of efficiency of the patch antenna shown in FIG. 35.
Figure 38A:
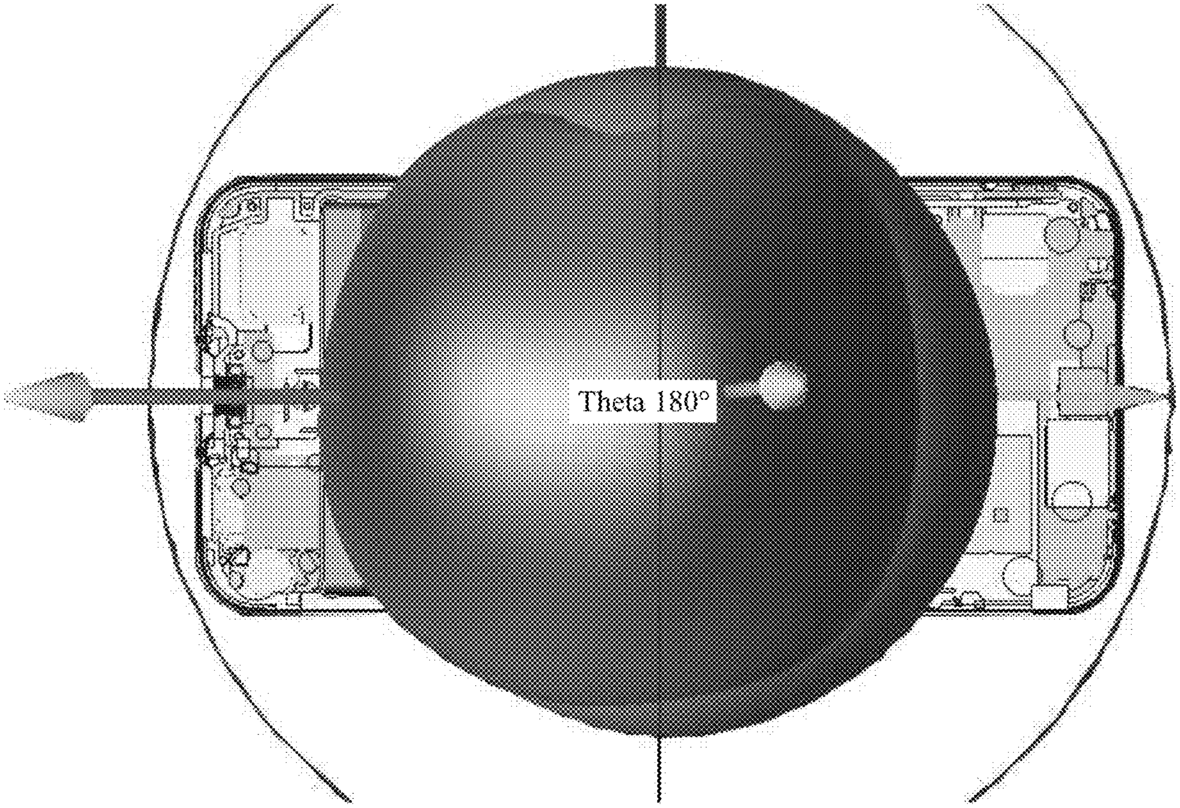
FIG. 38(*a*) to FIG. 38(*d*) are directivity patterns of the patch antenna shown in FIG. 35.
Figure 38B:
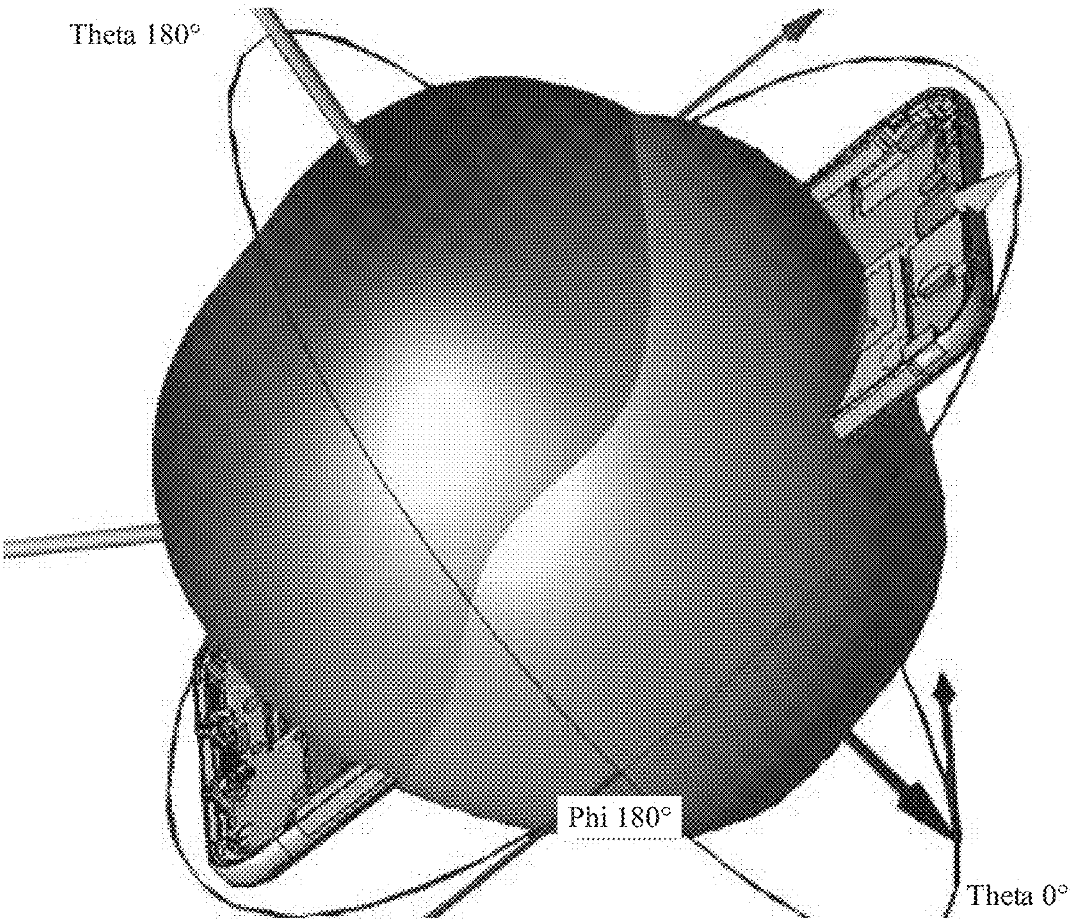
Figure 38C:
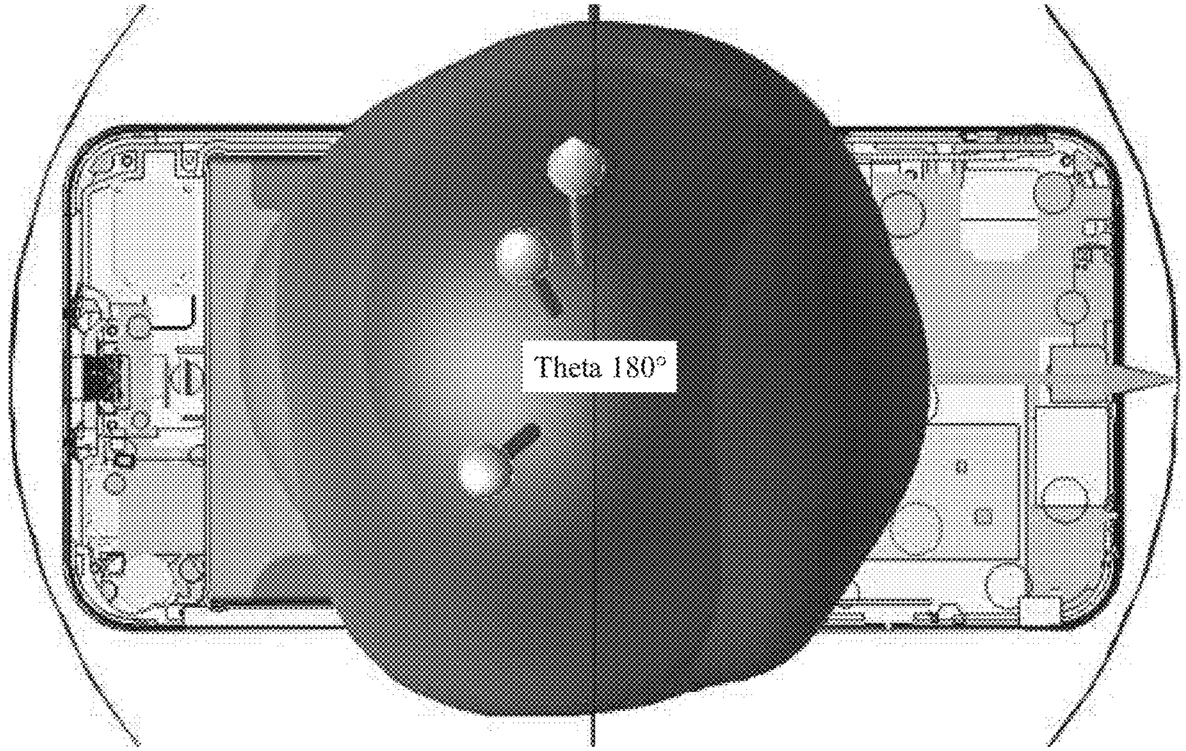
Figure 38D:
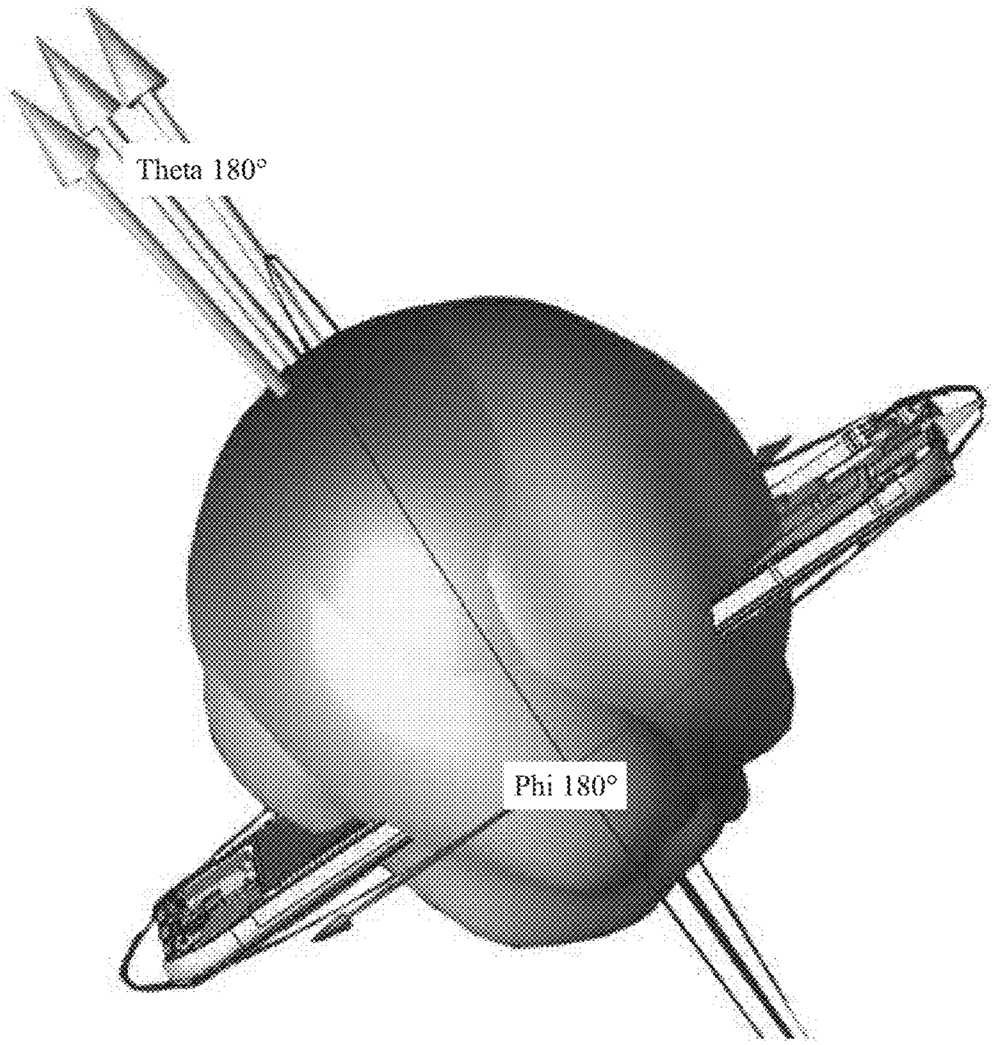

For S11, efficiency, and a directivity pattern generated by the patch antenna in this embodiment, refer to FIG. 36 to FIG. 38(*d*) respectively. In FIG. 36 and FIG. 37, a curve 000007 corresponds to the second state of the patch antenna, a curve 000012 corresponds to the third state of the patch antenna, and a curve 000013 corresponds to the first state of the patch antenna. FIG. 38(*a*) and FIG. 38(*b*) are directivity patterns in which an operating frequency band of the patch antenna is 2.4 G, and FIG. 38(*c*) and FIG. 38(*d*) are directivity patterns in which an operating frequency band of the patch antenna is 4.9 G.

Directivity patterns generated in the foregoing three states are different. When a mobile device installed with the antenna, for example, a mobile phone, moves, different states are switched to meet a user requirement.

An embodiment of this application further discloses an electronic device. The electronic device includes a mainboard and the antenna in the foregoing embodiment, and the antenna further includes an LDS support. The patch radiator is disposed on the LDS support, and the LDS support is disposed on the mainboard. In another embodiment, the antenna may also include a flexible circuit board, the patch radiator is disposed on the flexible circuit board, and the flexible circuit board is connected to the mainboard.

Figure 39:
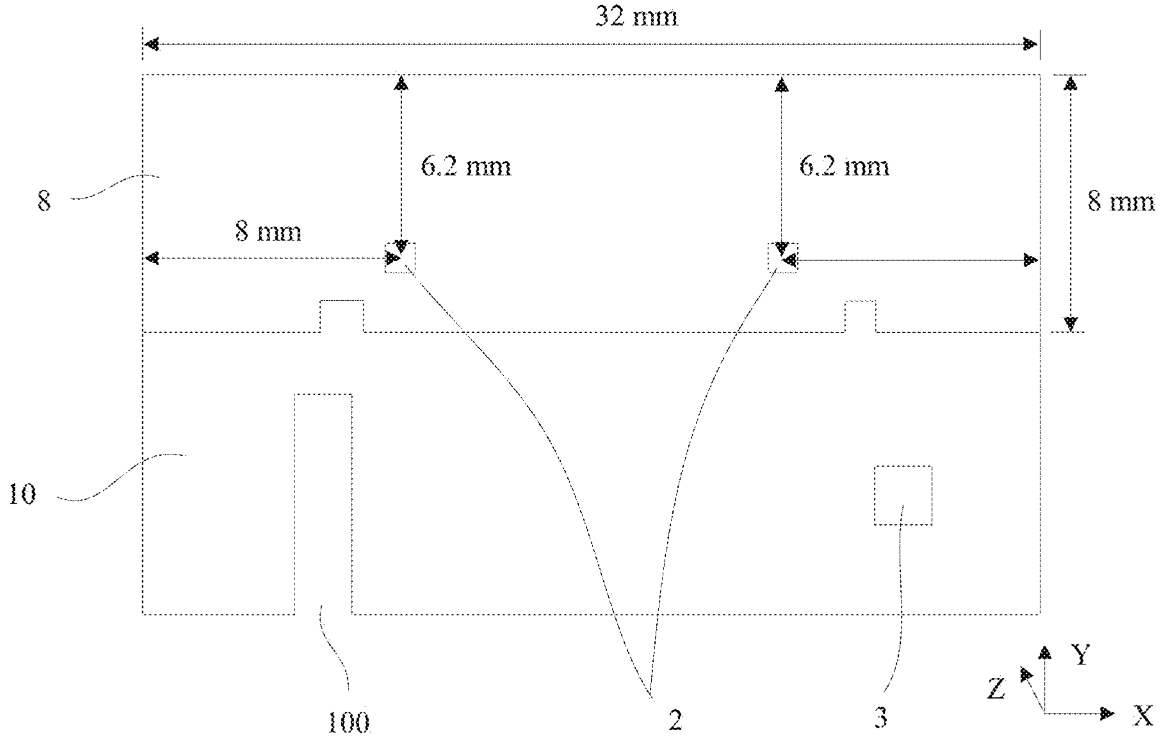
FIG. 39 is a schematic diagram of coupling between a patch antenna and a radiator according to an embodiment of this application.
Figure 40:
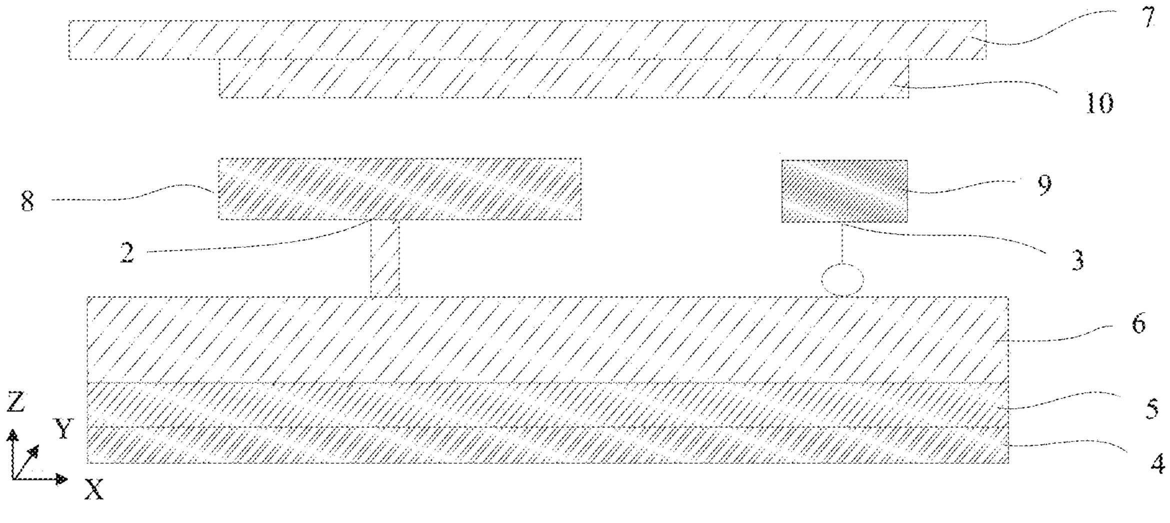
FIG. 40 is a sectional view of an electronic device according to an embodiment of this application.

FIG. 39 is a schematic diagram of coupling between a ground point and a radiator according to an embodiment of this application. FIG. 40 is a sectional view of an electronic device according to an embodiment of this application. The radiator in the figure may be referred to as a floating radiator. "Floating" means that the radiator is not directly connected to a wire/feed branch and a ground cable/ground branch, but is fed and grounded in an indirect coupling manner. It should be understood that "floating" does not mean that there is no structure around the radiator to support the radiator. In an embodiment, the floating radiator may be, for example, a floating metal disposed on an inner surface of a battery cover.

An embodiment of this application further discloses an electronic device. The electronic device includes a screen 4, a middle frame 5, a mainboard 6, a patch radiator 10, a battery cover 7, a first branch 8, and a second branch 9. The screen 4, the middle frame 5, the mainboard 6, the patch radiator 10, and the battery cover 7 are sequentially disposed along a thickness direction (a Z direction in FIG. 39 or FIG. 40) of the electronic device. The first branch 8 and the second branch 9 are disposed between the main board 6 and the patch radiator 10, and are disposed at an interval from the patch radiator 10. A first ground point and a second ground point are disposed on the first branch 8, and a feed point is disposed on the second branch 9, so that the first ground point, the second ground point, and the feed point are indirectly coupled to the patch radiator 10.

Further, the patch radiator 10 is disposed on an inner side of the battery cover 7 and is located between the first branch and the battery cover 7 along the thickness direction of the electronic device. In an embodiment, the patch radiator 10 may be disposed on the inner surface of the battery cover 7 by using any process, for example, pasting, or by using a metal printing process. In an embodiment, the patch radiator 10 may be disposed close to the inner surface of the battery cover 7 (for example, when the battery cover 7 is insulated), or may be disposed on the inner surface by using an insulation film layer on the inner surface of the battery cover 7.

Specifically, the patch radiator 10 is used as a main radiator, and the first branch 8 is indirectly coupled to the patch radiator 10 through space, so that transverse and longitudinal currents that are spread at a ground point projection are generated on the radiator. A coupling amount between the first branch 8 and the patch radiator 10 may be adjusted by controlling an overlapping area of projection areas of the first branch 8 and the patch radiator 10 and a spacing between the first branch 8 and the patch radiator 10. In this application, a floating radiator is additionally disposed, so that a height and a clearance of an antenna are increased, and a diameter of the antenna is also increased. This improves performance. A size of the first branch 8 is not required in this embodiment, as long as a coupling quantity is met. A size of the floating radiator corresponds to a size of the patch antenna in the foregoing embodiment, and a position of the ground point projected on the radiator corresponds to a position of the ground point disposed in the foregoing embodiment. For details, refer to the foregoing embodiment. Details are not described herein again.

In this embodiment of this application, for example, in the embodiment shown in FIG. 39, the first ground point and the second ground point are disposed on the first branch 8. It may be understood that, in this embodiment, the patch radiator 10 has a first coupling contact and a second coupling contact. The first ground point is coupled to the patch radiator through the first coupling contact, and grounds the patch radiator, and the second ground point is coupled to the patch radiator through the second coupling contact, and grounds the patch radiator. A number 2 shown in FIG. 39 is used to represent the first ground point and the second ground point on the first branch 8, and the first coupling contact and the second coupling contact are not shown in the figure. It should be understood that a projection position of the first ground point on the floating radiator may be the first coupling contact, and a projection position of the second ground point on the floating radiator may be the second coupling contact.

Figure 41:
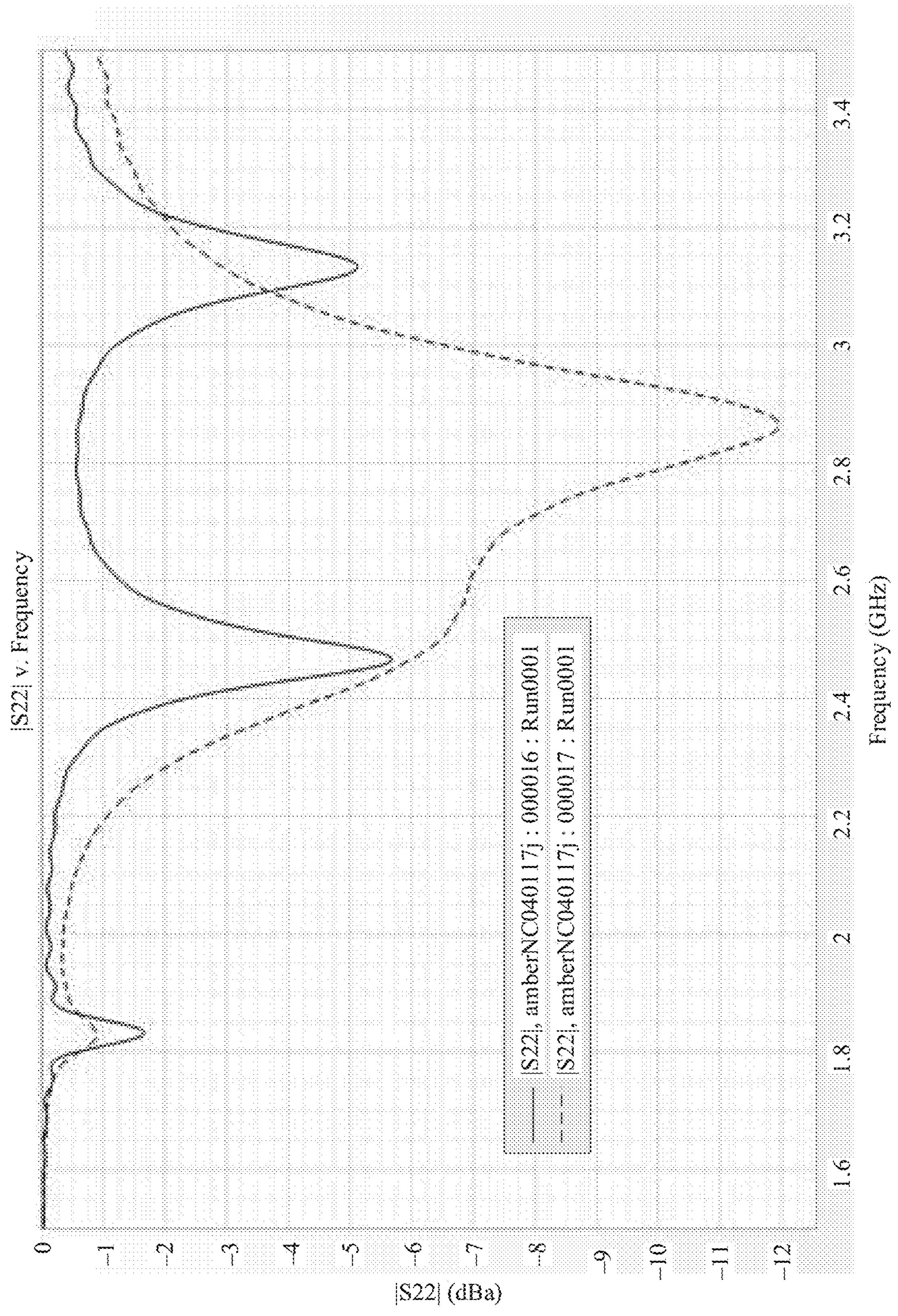
FIG. 41 is a schematic diagram of S11 of the patch antenna shown in FIG. 39.
Figure 42:
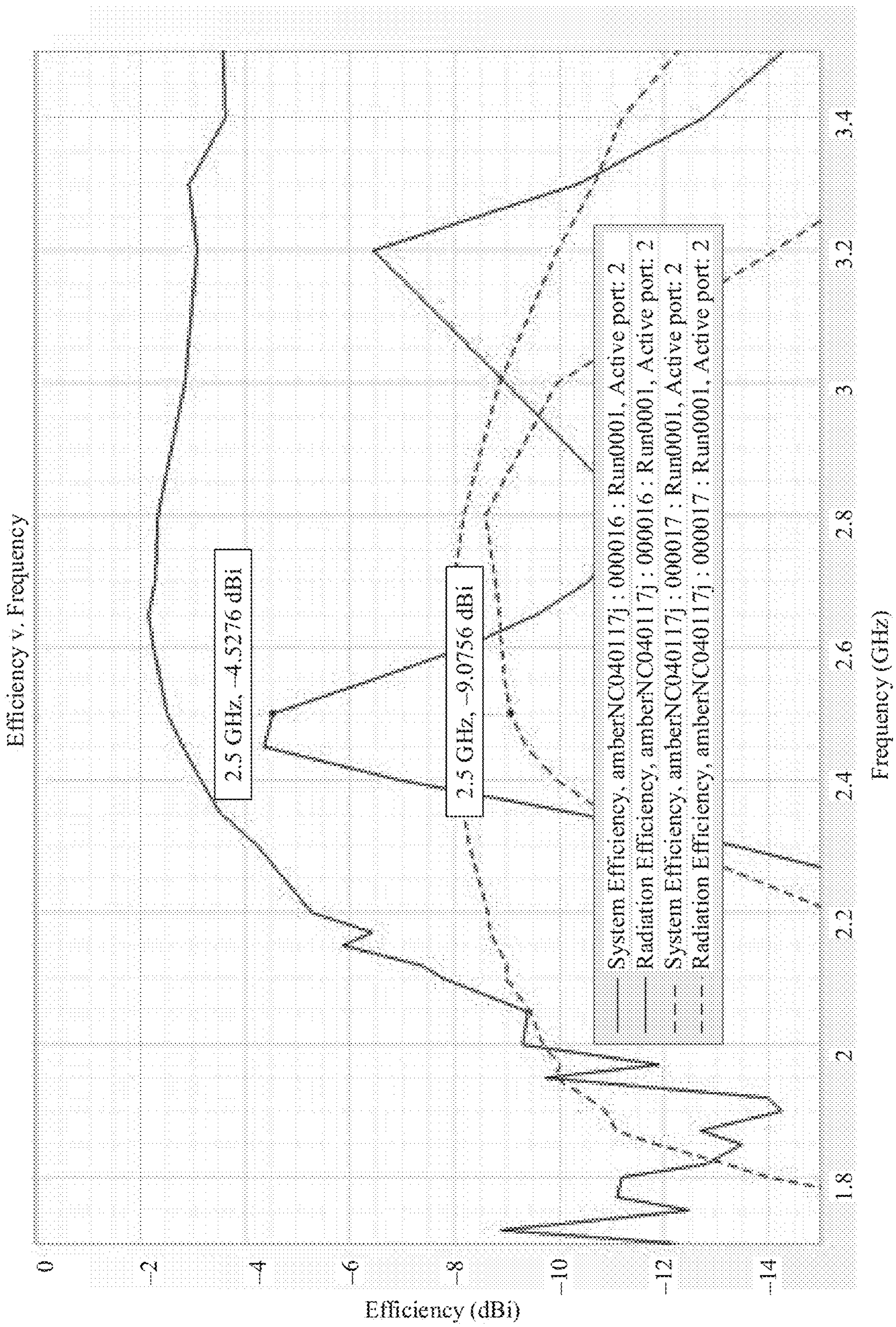
FIG. 42 is a schematic diagram of efficiency of the patch antenna shown in FIG. 39.
Figure 43:
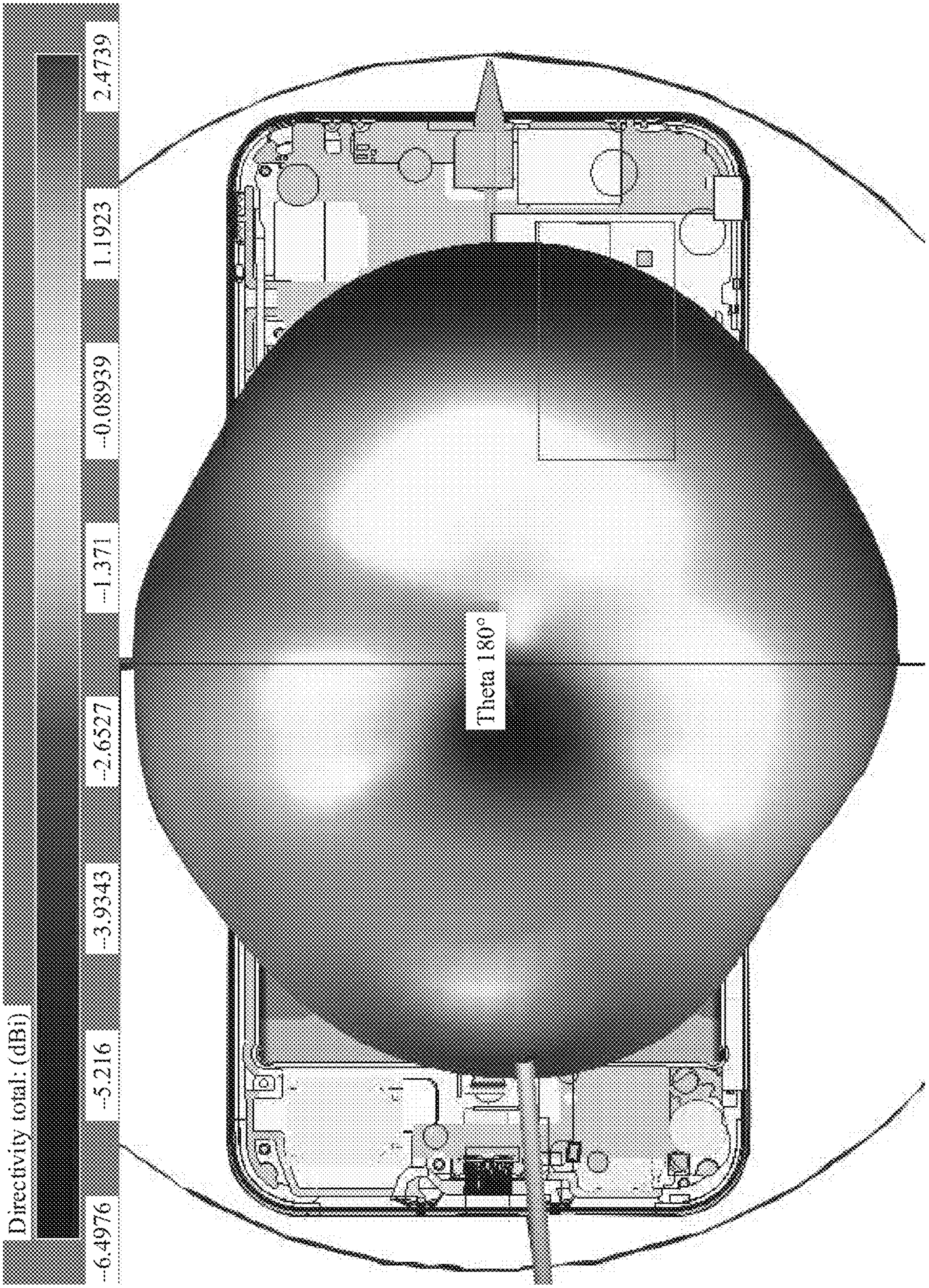
FIG. 43 is a directivity pattern of the patch antenna shown in FIG. 39.

S11, efficiency, and a directivity pattern generated by the patch antenna in this embodiment are respectively shown in FIG. 41, FIG. 42, and FIG. 43. A curve 000016 in FIG. 41 and FIG. 42 corresponds to a C mode of the patch antenna, and a curve 00017 in FIG. 41 and FIG. 42 corresponds to a D mode of the patch antenna. FIG. 43 is a directivity pattern of the patch antenna whose operating frequency band is 2.45 G. Parameter values of the patch antenna are shown in Table 8.

Table 8 shows parameter values of another antenna

| | | |
|---|---|---|
| Input power 24 dBm | Resonance frequency | 2.45 GHz |
| | | 1 g |
| | FS simulation efficiency | −4.4 |
| Body SAR | 5 mm backside | 4.25 |

The electronic device may be a smartphone, a tablet, a patch antenna, a patch branch, or a radiator, and may be made on a support, including but not limited to a flexible printed circuit (English full name: Flexible Printed Circuit, FPC for short), laser direct structuring (English full name: Laser Direct Structuring, LDS for short), a steel sheet, printed silver paste, and the like.

The foregoing descriptions are merely preferred embodiments of this application, and are not intended to limit this application. For a person skilled in the art, this application may have various modifications and variations. Any modification, equivalent replacement, or improvement made without departing from the spirit and principle of this application shall fall within the protection scope of this application.

What is claimed is:

1. An antenna comprising:

a floating patch radiator comprising:

two long side edges disposed opposite to each other and comprising a first side edge;

two short side edges disposed opposite to each other and comprising a second side edge, wherein the first side edge intersects with the second side edge;

a first coupling contact; and a second coupling contact, wherein the first coupling contact and the second coupling contact are disposed at a first interval;

a feed point indirectly coupled to the floating patch radiator in a biased manner;

a first ground point indirectly coupled to the floating patch radiator through the first coupling contact and configured to ground the floating patch radiator; and a second ground point indirectly coupled to the floating patch radiator through the second coupling contact and configured to ground the floating patch radiator, wherein distances from the first coupling contact to each of the two long side edges and each of the two short side edges, and from the second coupling contact to each of the long side edges and each of the short side edges are all greater than or equal to $0.05\lambda$, and wherein $\lambda$ is a maximum operating wavelength of the antenna in an operating frequency band range of the antenna.

2. The antenna of claim 1, wherein the feed point is configured to capacitively feed the floating patch radiator.

3. The antenna of claim 1, wherein the first coupling contact and the second coupling contact are spaced on the floating patch radiator along a first direction, wherein the first ground point, the second ground point, and the feed point are spaced on the floating patch radiator along a second direction, wherein the first direction is an extension direction of the first side edge, and wherein the second direction is an extension direction of the second side edge.

4. The antenna of claim 3, wherein a fifth distance between the first coupling contact and the second coupling contact is greater than $0.1\lambda$ along the first direction.

5. The antenna of claim 3, wherein the floating patch radiator further comprises a groove disposed on the first side edge and recessed along the second direction.

6. The antenna of claim 1, wherein a distance from the first coupling contact to a first long side edge is H1, wherein a distance from the first coupling contact to a first short side edge is W1, wherein a distance from the second coupling contact to a second long side edge is H2, wherein a distance from the second coupling contact to a second short side edge is W2, wherein $0.25\lambda \leq W1+H1 \leq 0.5\lambda$, and wherein $0.25\lambda \leq W2+H2 \leq 0.5\lambda$.

7. The antenna of claim 6, wherein either W1=W2 or H1=H2.

8. The antenna of claim 1, wherein the floating patch radiator is a support antenna radiator, and wherein the first ground point, the second ground point, and the feed point are directly coupled to the support antenna radiator.

9. The antenna of claim 1, wherein each of a first length of the first side edge and a second length of the second side edge is less than $0.5\lambda$.

10. The antenna of claim 1, further comprising a switch coupled to the first ground point and the second ground point and configured to:

control a first connection between the first ground point and a ground; and control a second connection between the second ground point and the ground.

11. The antenna of claim 1, further comprising a branch disposed at a second interval from the floating patch radiator, wherein the first ground point and the second ground point are disposed on the branch, and wherein the floating patch radiator is indirectly coupled and grounded through the branch.

12. The antenna of claim 1, further comprising a branch disposed at a second interval from the floating patch radiator, wherein the feed point is disposed on the branch, and wherein the floating patch radiator is indirectly coupled and fed through the branch.

13. An electronic device comprising:

a mainboard;

a battery cover; and an antenna comprising:

a floating patch radiator comprising:

two long side edges disposed opposite to each other and comprising a first side edge;

two short side edges disposed opposite to each other and comprising a second side edge, wherein the first side edge intersects with the second side edge;

a first coupling contact; and
a second coupling contact, wherein the first coupling contact and the second coupling contact are disposed at an interval;
a feed point indirectly coupled to the floating patch radiator in a biased manner;
a first ground point indirectly coupled to the floating patch radiator through the first coupling contact and configured to ground the floating patch radiator; and
a second ground point indirectly coupled to the floating patch radiator through the second coupling contact and configured to ground the floating patch radiator,
wherein distances from the first coupling contact to each long side edge and each short side edge, and from the second coupling contact to each long side edge and each short side edge are all greater than or equal to 0.05λ,
wherein λ is a maximum operating wavelength of the antenna in an operating frequency band range of the antenna, and
wherein the mainboard, the floating patch radiator, and the battery cover are sequentially disposed along a thickness direction of the electronic device.

14. The electronic device of claim 13, wherein the first coupling contact and the second coupling contact are spaced on the floating patch radiator along a first direction, wherein the first ground point, the second ground point, and the feed point are spaced on the floating patch radiator along a second direction, wherein the first direction is an extension direction of the first side edge, and wherein the second direction is an extension direction of the second side edge.

15. The electronic device of claim 14, wherein a distance between the first coupling contact and the second coupling contact is greater than 0.12 along the first direction.

16. The electronic device of claim 13, wherein a distance from the first coupling contact to a first long side edge is H1, wherein a distance from the first coupling contact to a first short side edge is W1, wherein a distance from the second coupling contact to a second long side edge is H2, wherein a distance from the second coupling contact to a second short side edge is W2, wherein $0.25\lambda \leq W1+H1 \leq 0.5\lambda$, and wherein $0.25\lambda \leq W2+H2 \leq 0.5\lambda$.

17. The electronic device of claim 13, wherein the antenna further comprises a support disposed on the mainboard, and wherein the floating patch radiator is disposed on the support.

18. The electronic device of claim 13, wherein the battery cover comprises an insulation inner surface, and wherein the floating patch radiator is disposed on the insulation inner surface.

19. The electronic device of claim 13, wherein the antenna further comprises a branch, wherein the floating patch radiator is indirectly coupled to a ground through the branch, and wherein the mainboard, the branch, the floating patch radiator, and the battery cover are sequentially disposed along the thickness direction.

20. The electronic device of claim 13, wherein the feed point is configured to capacitively feed the floating patch radiator.

* * * * *